Aug. 4, 1936.   B. M. SHIPLEY   2,050,022
CASH REGISTER
Filed Sept. 9, 1931   18 Sheets-Sheet 1

Inventor
Bernis M. Shipley
By
His Attorney

Aug. 4, 1936.  B. M. SHIPLEY  2,050,022
CASH REGISTER
Filed Sept. 9, 1931   18 Sheets-Sheet 4

Inventor
Bernis M. Shipley
By
Earl Beust
His Attorney

Aug. 4, 1936.　　　　B. M. SHIPLEY　　　　2,050,022
CASH REGISTER
Filed Sept. 9, 1931　　　18 Sheets-Sheet 5
FIG. 6
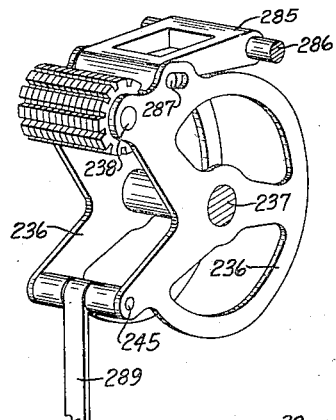
FIG. 7
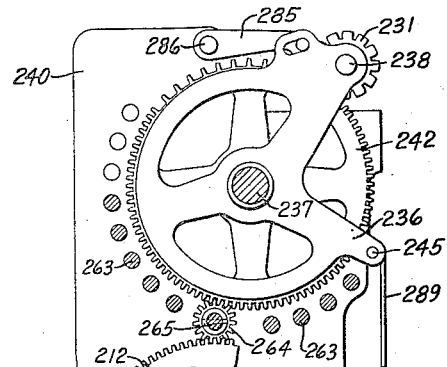
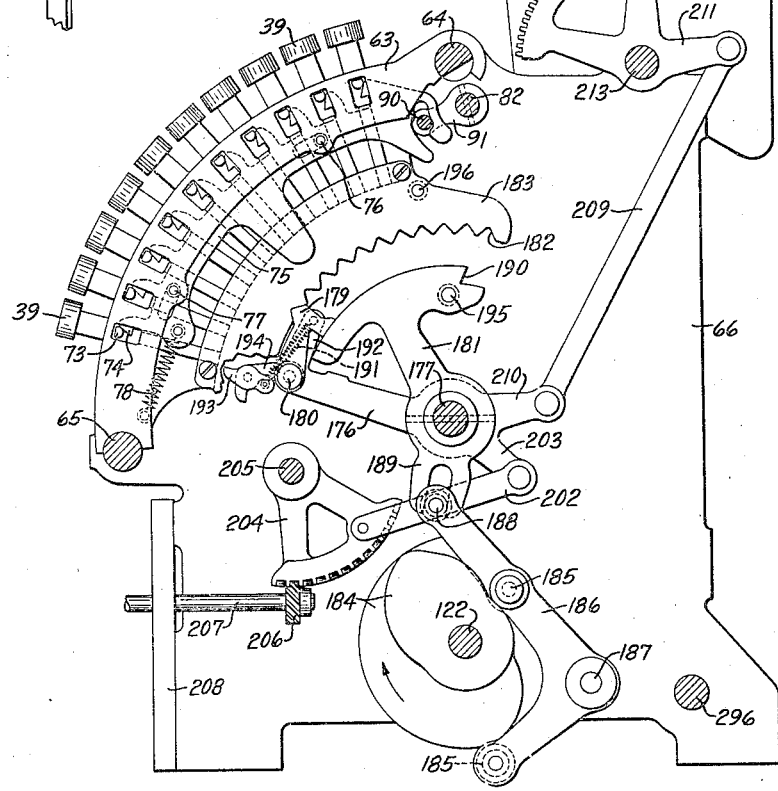
Inventor
Bernis M. Shipley
By
Carl Beust
His Attorney Aug. 4, 1936.                B. M. SHIPLEY                 2,050,022
                              CASH REGISTER
                    Filed Sept. 9, 1931        18 Sheets-Sheet 6
FIG. 8
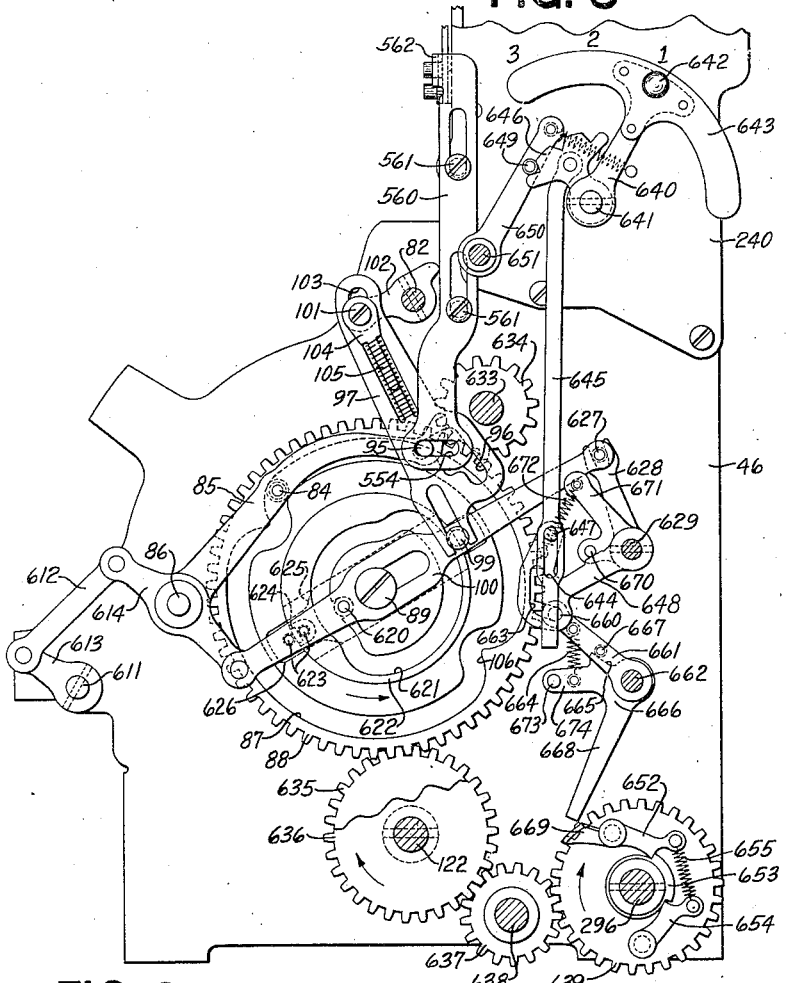
FIG. 9       FIG. 10
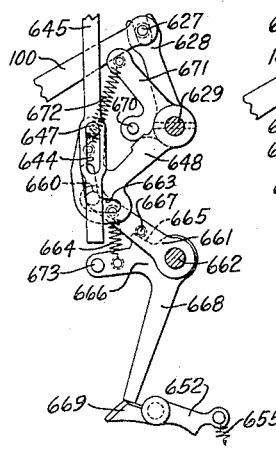 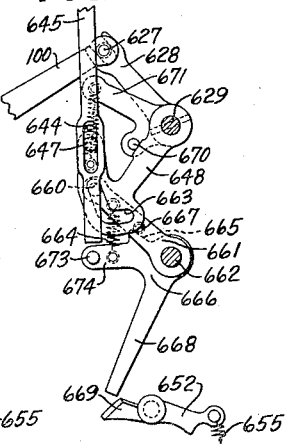
Inventor
Bernis M. Shipley
By
Earl Beust
His Attorney Aug. 4, 1936.    B. M. SHIPLEY    2,050,022
CASH REGISTER
Filed Sept. 9, 1931    18 Sheets-Sheet 7

Inventor
Bernis M. Shipley
By
Carl Beust
His Attorney

Aug. 4, 1936.　　　　　B. M. SHIPLEY　　　　　2,050,022
CASH REGISTER
Filed Sept. 9, 1931　　　18 Sheets-Sheet 9
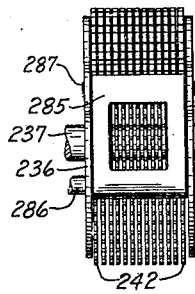
FIG. 15
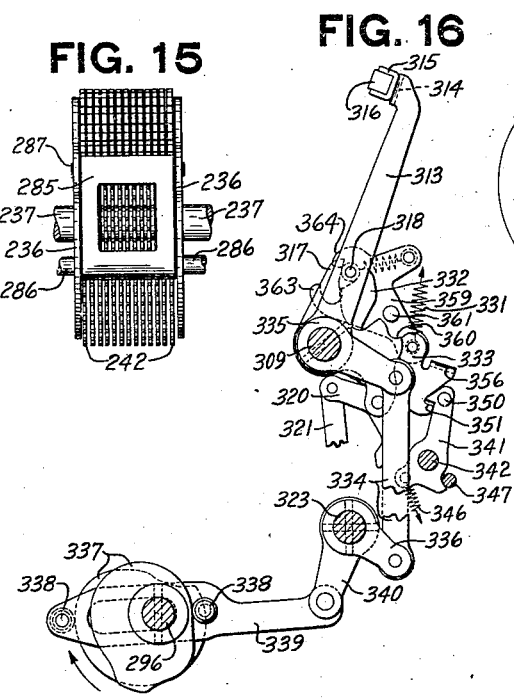
FIG. 16　　FIG. 17
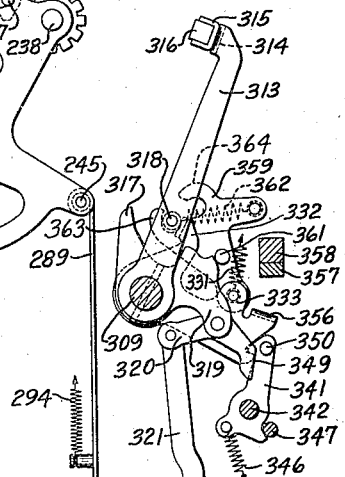
FIG.18
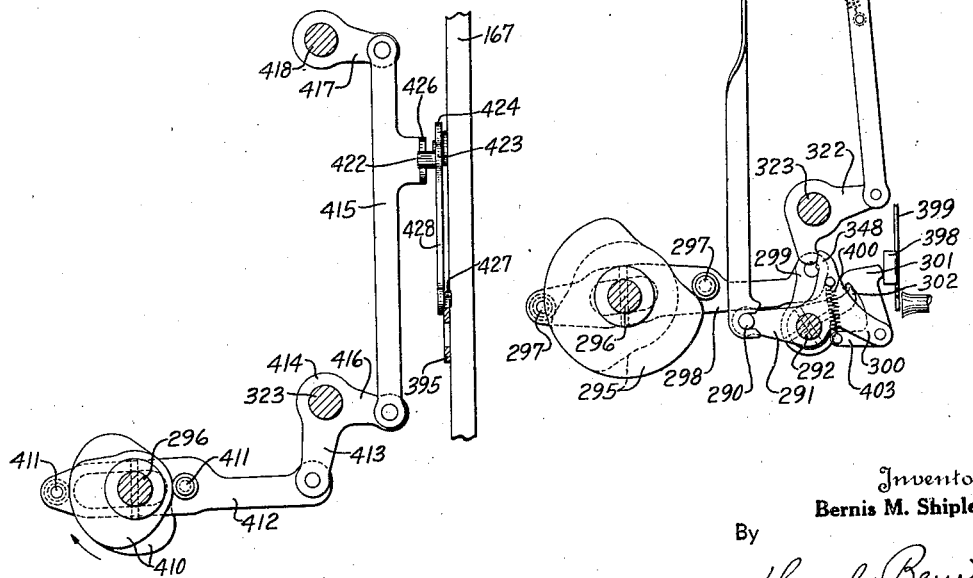
Inventor
Bernis M. Shipley
By Carl Beust
His Attorney Aug. 4, 1936.  B. M. SHIPLEY  2,050,022
CASH REGISTER
Filed Sept. 9, 1931  18 Sheets-Sheet 10

Inventor
Bernis M. Shipley
By
His Attorney

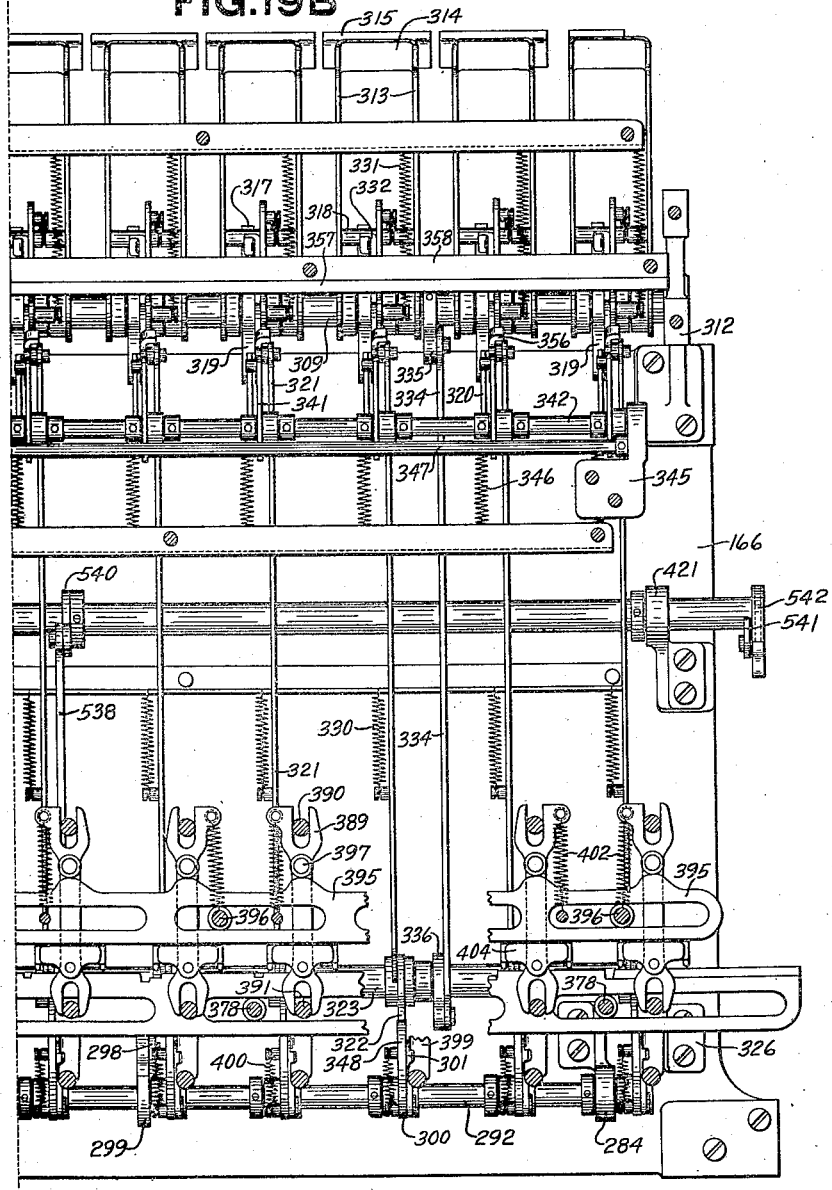

Aug. 4, 1936.  B. M. SHIPLEY  2,050,022
CASH REGISTER
Filed Sept. 9, 1931   18 Sheets-Sheet 13

Inventor
Bernis M. Shipley
By
*Pearl Beust*
His Attorney

Aug. 4, 1936.  B. M. SHIPLEY  2,050,022
CASH REGISTER
Filed Sept. 9, 1931   18 Sheets-Sheet 14

Inventor
Bernis M. Shipley
By
Earl Beust

His Attorney

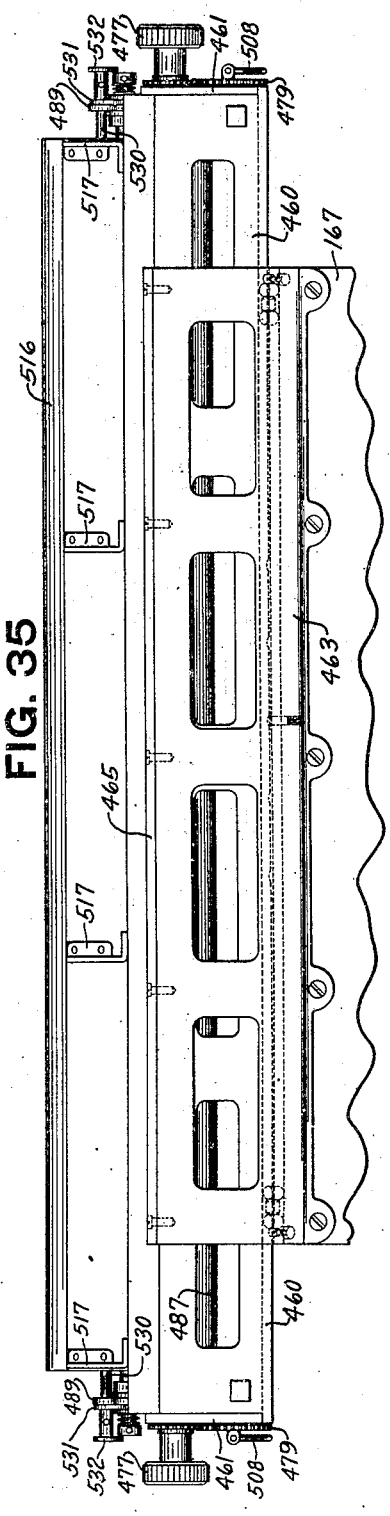

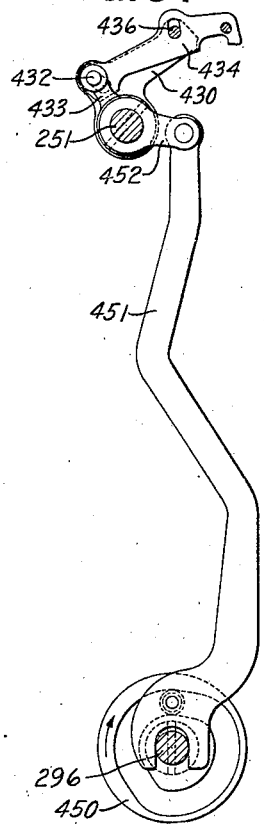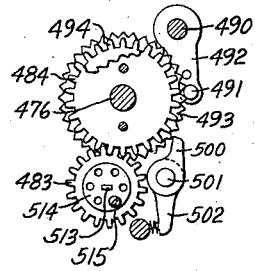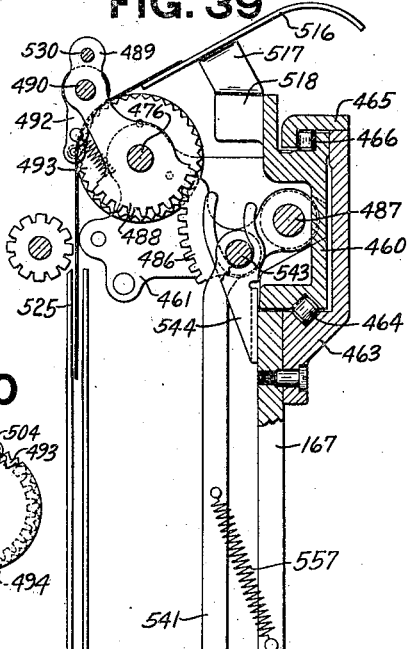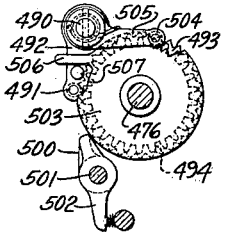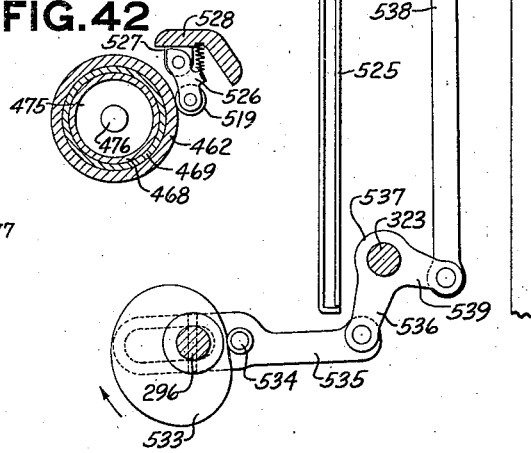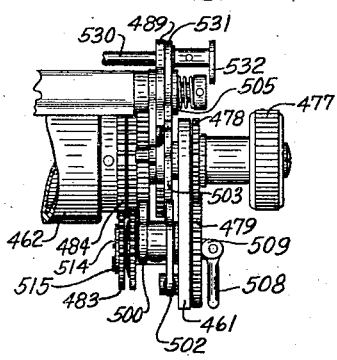

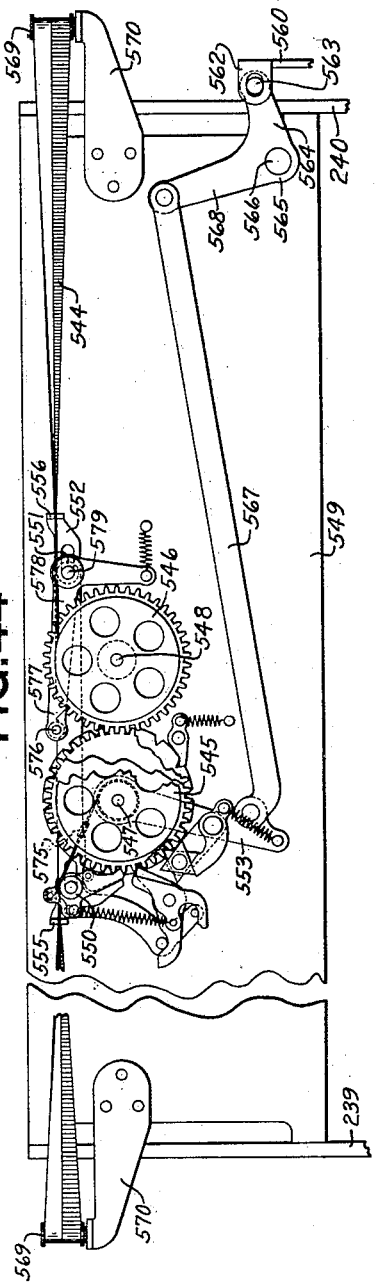

Aug. 4, 1936.                B. M. SHIPLEY                2,050,022
                              CASH REGISTER
                        Filed Sept. 9, 1931        18 Sheets—Sheet 18

Inventor
Bernis M. Shipley
By Carl Berust

His Attorney

Patented Aug. 4, 1936

2,050,022

UNITED STATES PATENT OFFICE 2,050,022

CASH REGISTER

Bernis M. Shipley, Dayton, Ohio, assignor to The National Cash Register Company, Dayton, Ohio, a corporation of Maryland Application September 9, 1931, Serial No. 561,953

42 Claims. (Cl. 235—2)

This invention relates to registering and recording mechanisms, and is more particularly directed to improvements in mechanisms for selecting any of a plurality of columns and printing in the selected column or columns.

The invention is herein shown embodied in a machine of the type illustrated and described in Letters Patent of the United States, No. 1,242,170, granted to F. L. Fuller on October 9, 1917, and No. 1,619,796, granted to B. M. Shipley on March 1, 1927, and in the application for Letters Patent of the United States, Serial No. 576,924, filed July 24, 1922, of B. M. Shipley, now Patent No. 1,840,639, granted January 12, 1932.

The machine embodying the present invention, as herein illustrated and hereinafter described, is particularly adapted for use in public utility offices, such as for instance, one supplying to the public artificial or natural gas, electric power, telephone service, water service, and other analogous businesses.

It is customary with such public utility companies in preparing the monthly statements or bills, to use multiple stub or sectional statements, each section or stub being sent to a different place, and conveying information pertinent to the department or individual for which it is intended. For instance, the bill illustrated in the drawings accompanying and forming a part of this application is divided into four sections having for their destinations the collection department, the cashier's department, the bookkeeping department and the remaining section is sent to the customer as his statement. The statement may be variously formed to correspond to the particular line of business in which it is used, and as illustrating one of the many applications of the invention, its use will be described in connection with a public service corporation as one supplying electricity and gas.

The information printed on the statements prepared by corporations supplying electricity and gas, usually includes the previous meter reading, the present meter reading, the amount of the commodity consumed, the amount in dollars and cents of the bill due the company, the meter number and the date.

It is an object of the present invention to provide a cash register of the type illustrated, with mechanism capable of printing data in any one or in any group of a plurality of columns, in addition to the usual printing done by machines of this type.

Another object of this invention is to provide means for distributing to and accumulating on a plurality of totalizers with which the machine is provided, the data mentioned above simultaneously with and incident to the preparation of the statement.

Another object is to provide novel means to manually disable the printing mechanism on certain operations of the machine and to automatically render said printing mechanism effective on certain other operations of the machine.

Still another object is to provide novel mechanism for selecting the particular column or columns in which the impression is to be made.

Another object is to provide novel means to trip the impression hammer or hammers selected to make the impression.

Another object is to provide novel means to prevent the printing of zeros to the left of the highest digital denomination.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

In said drawings:

Fig. 6 is a detail perspective view of one of the groups of type wheels together with the rocking frame therefor and the type wheel aligner.

Fig. 7 is a vertical sectional view through the machine to the right of one of the banks of meter number keys.

Fig. 8 is a vertical section taken on line 8—8 of Fig. 33, and having the upper printer disabling mechanism superimposed thereon.

Fig. 9 is a detail side view of a part of the disabling mechanism for the upper printer with the manual disabling means in position to disable the upper printer drive.

Fig. 10 is a similar view showing the mechanism adjusted under control of the total lever to permit the upper printer to operate on the second half of a total taking operation.

Fig. 15 is a fragmentary plan view of a group of type wheels, the type wheel gears therefor, and the aligners for said wheels.

Fig. 16 is a detail side view of the mechanism which releases the selected hammer to make the impression and restores the hammer after an impression has been made.

Fig. 17 is a detail side view of the mechanism which rocks the type wheel frame to shift the selected type wheel group to its printing position, and which engages the type wheel aligner with the type wheels. This view also illustrates the hammer rebound preventer.

Fig. 18 is a detail side view illustrating the mechanism which operates the hammer selecting cam plate.

Figure 19A:
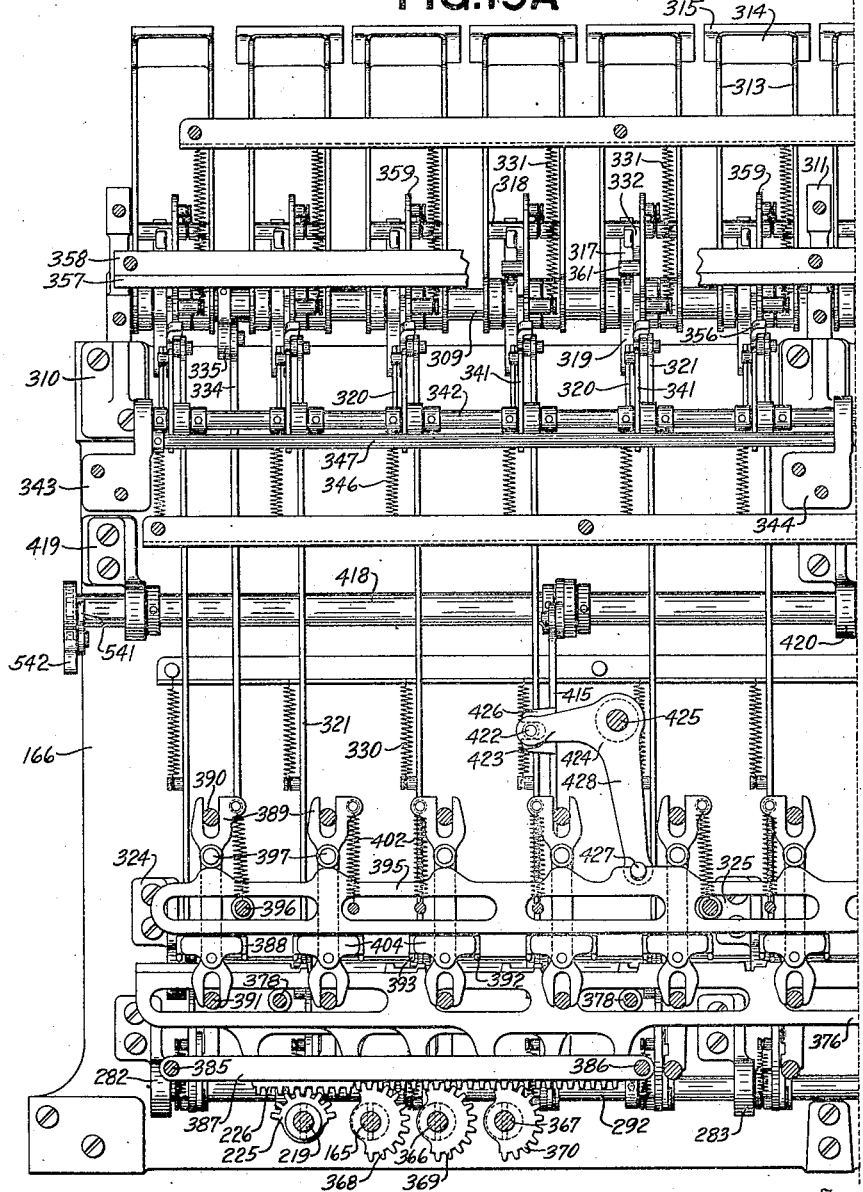

Figs. 19—A and 19—B taken together, form a view in rear elevation taken immediately inside the back frame of the printer.

Figure 20:
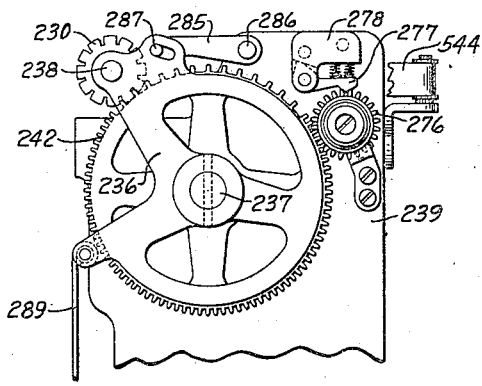

Fig. 20 is a detail view in left elevation of the group of date printing wheels and the means for adjusting these wheels.

Figure 21:
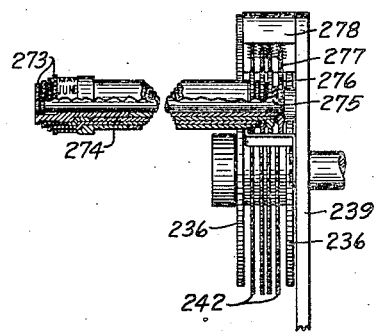

Fig. 21 is a detail view, partly broken away, showing the knobs for adjusting the date printing wheels.

Figure 22:
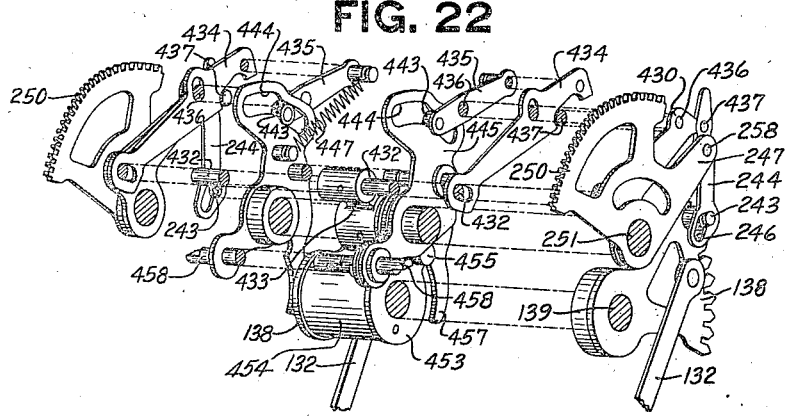

Fig. 22 is a disjoined perspective view of the zero eliminating mechanism.

Figures 23, 24:
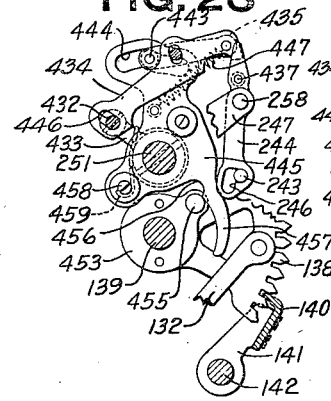
Figure 22A:
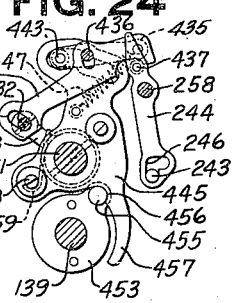

Fig. 22A is a detail view of a part of the mechanism shown in Figs. 22, 23, and 24.

Fig. 23 is a fragmentary side view of a part of the zero eliminating mechanism in the position assumed when the zeros are not to be eliminated.

Fig. 24 is a similar view of the same mechanism in the position assumed when the zeros are to be eliminated.

Figure 25:
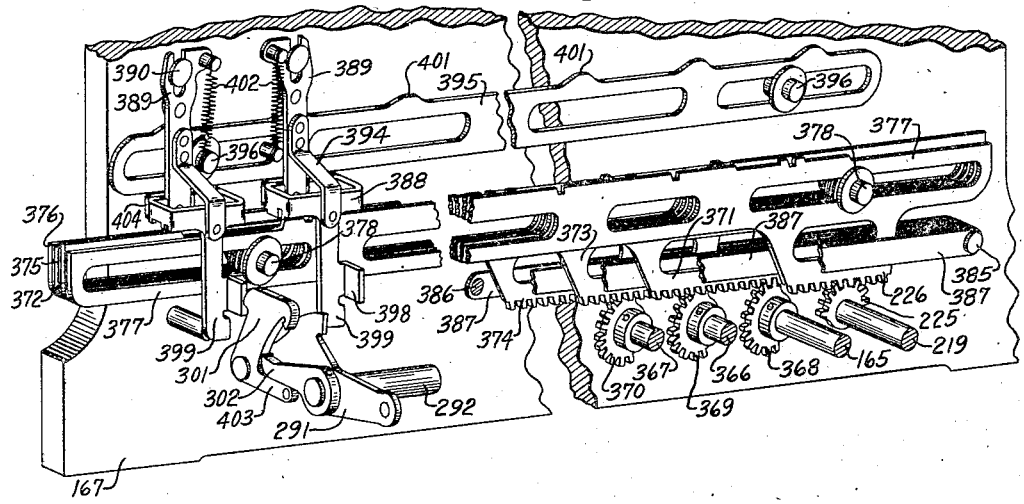

Fig. 25 is a detail perspective view of the hammer selecting mechanism.

Figure 26:
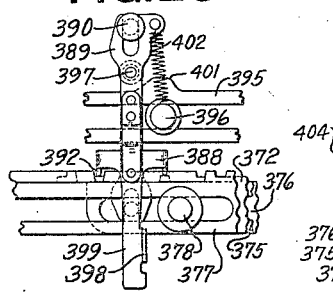

Fig. 26 is a fragmentary side view showing one of the hammer selecting devices and the manner in which it co-operates with the selecting slides.

Figure 27:
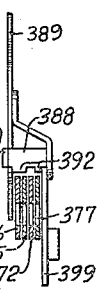

Fig. 27 is a fragmentary view in left elevation of one of the rocking feeler finger frames showing the manner in which the feeler fingers co-operate with the selecting slides.

Figure 28:
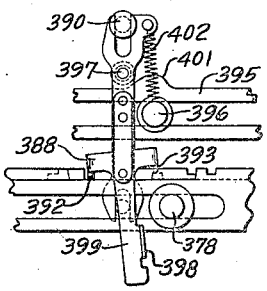

Fig. 28 is a view similar to Fig. 26, showing the same mechanism with the rocking feeler finger frame in position to disable the hammer.

Figure 29:
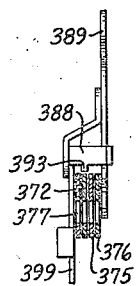

Fig. 29 is a fragmentary detail view in right elevation of the rocking feeler finger frame.

Figure 30:
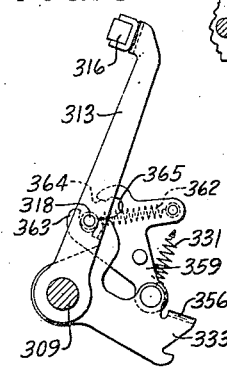
Figure 31:
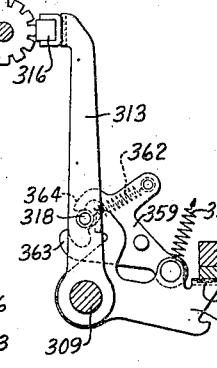
Figure 32:
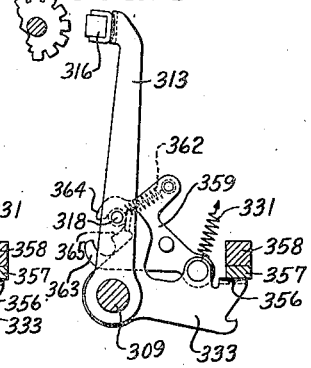

Figs. 30, 31 and 32 are detail side views illustrating the operation of the hammer rebound preventer.

Figure 33:
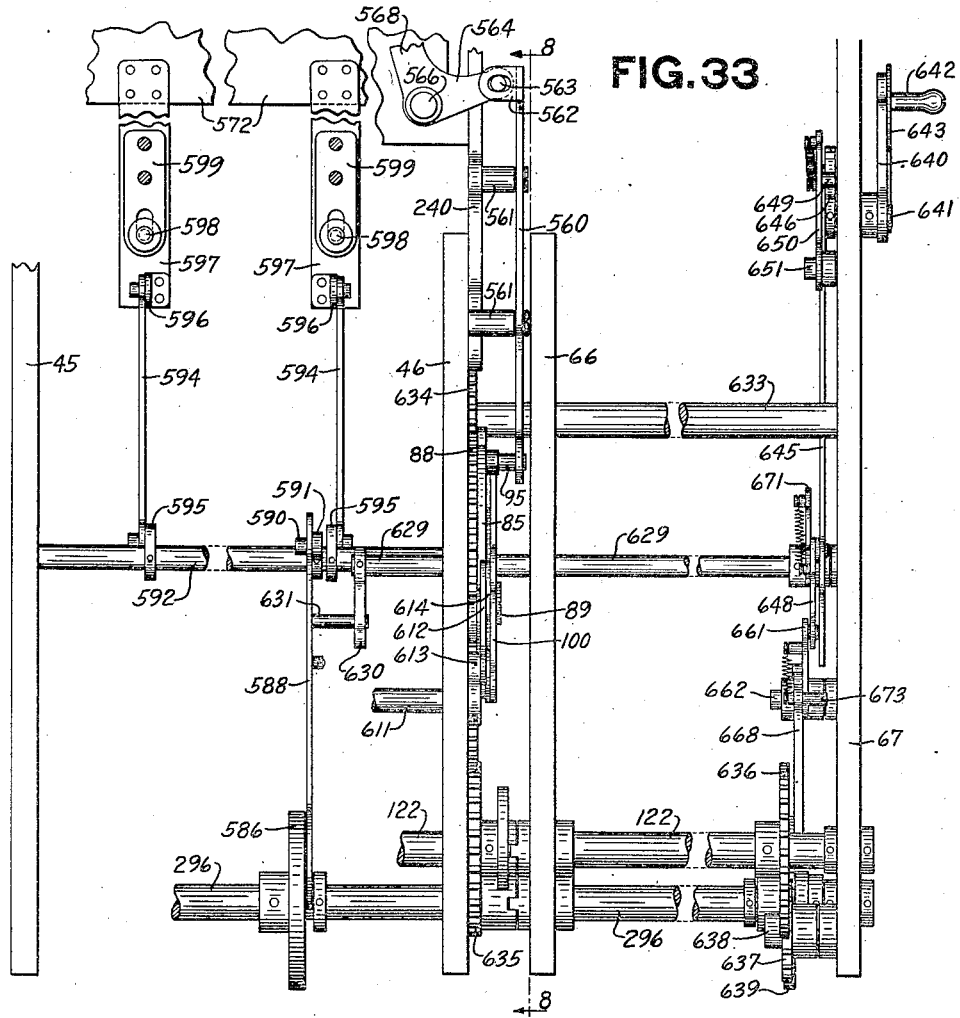

Fig. 33 is a skeletonized view of the mechanism for shifting the ink ribbon, together with the printer disabling mechanism.

Figure 34:
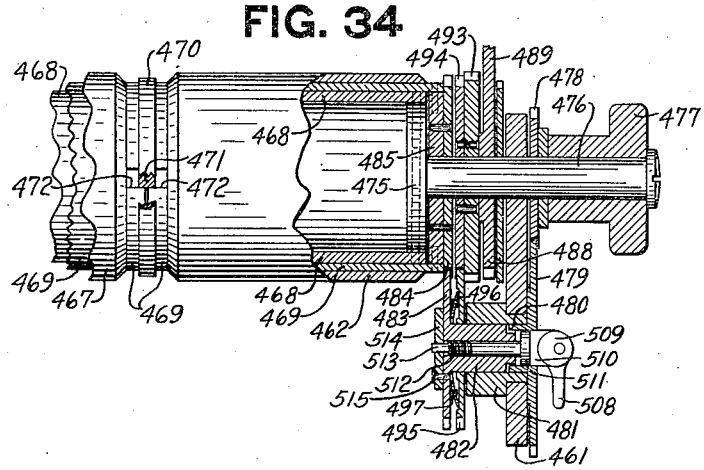

Fig. 34 is a fragmentary sectional view of the mechanism for feeding the paper and for shifting the paper feed roll.

Fig. 35 is a view in rear elevation of the paper carriage and the runway in which the carriage slides.

Fig. 36 illustrates one style of statement which may be prepared in the present machine.

Fig. 37 is a detail side view of the means which actuates the zero elimination mechanism.

Fig. 38 is an enlarged detail view of a part of the paper feeding mechanism.

Fig. 39 is a detail view, partly in section, of the mechanism which shifts and feeds the record material.

Fig. 40 is a detail side view of the mechanism which controls the length of feed of the record material.

Fig. 41 is a detail side view of the means which operates the paper tension device.

Fig. 42 is a detail sectional view of the paper tension device.

Fig. 43 is a fragmentary view in front elevation of the righthand end of the paper carriage.

Fig. 44 is a front elevation of the ink ribbon feeding and reversing means.

Fig. 45 is a top plan view of the mechanism illustrated in Fig. 44.

Figure 46:
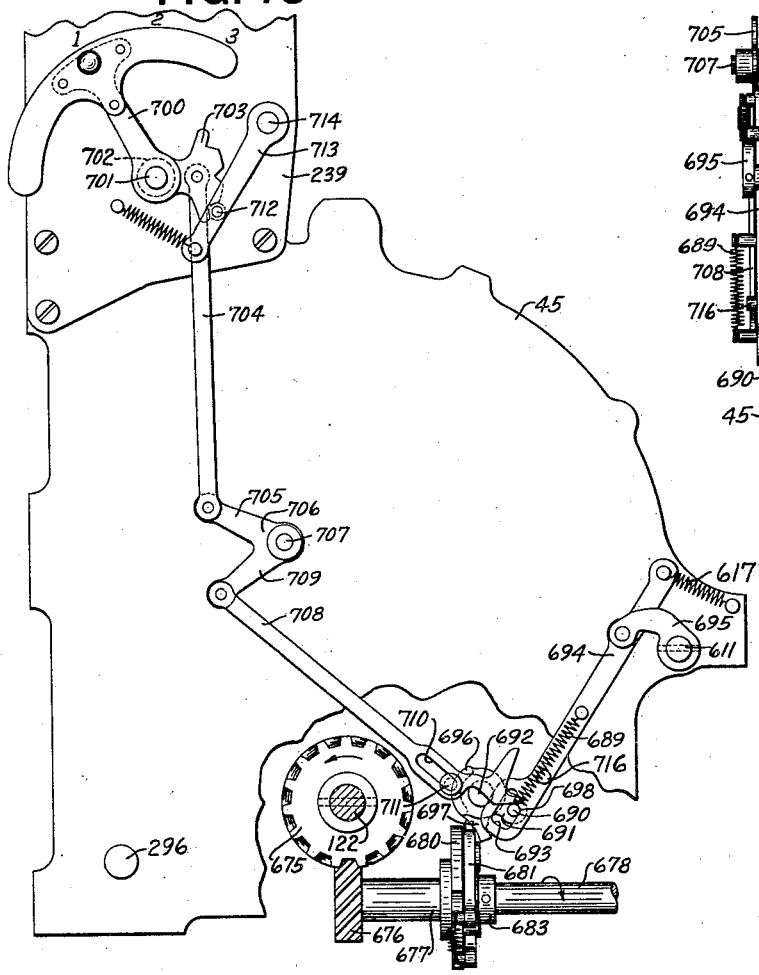

Fig. 46 is a view in left elevation of the mechanism which disables the front printer.

Figure 47:
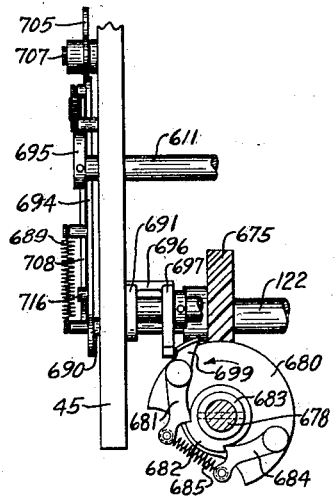

Fig. 47 is a fragmentary view in front elevation of the means which disables the front printer drive.

Figure 48:
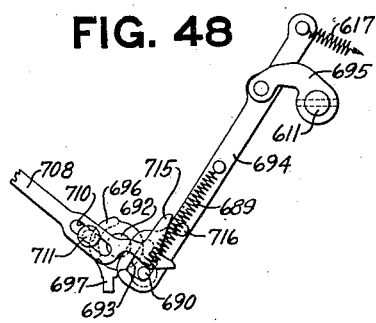

Fig. 48 is a fragmentary side view of the front printer disabling mechanism with the manually operated device in its intermediate position.

Figure 49:
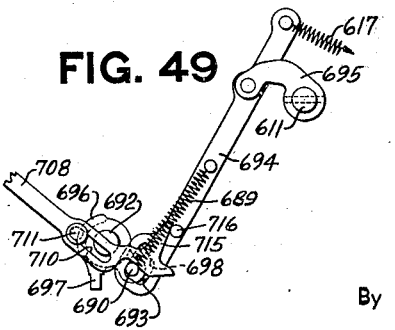

Fig. 49 is a similar view of the same mechanism with the manual control lever in its forward position.

*General description*

The machine of the present invention, as illustrated in the accompanying drawings, includes, generally, a cash register of a well known type, such as is disclosed in the above-mentioned patents, to the rear and top of which is applied the invention hereinafter set forth, comprising in the main, a printing device operated by and controlled from the machine.

A paper chute located between the machine proper and the new printing mechanism, is adapted to receive either a large sheet of record material, such as the ledger sheets used in banks, or a long narrow sheet, such as is commonly used by public utilities companies upon which to prepare the monthly statements to their customers.

The novel printing device includes a plurality of groups of type wheels, set up under control of manipulative keys. Each group of type wheels is provided with a printing hammer individual to its group, with which there is associated mechanism for selecting and operating the printing hammer.

A sliding carriage located at the top of the machine, accommodates record materials of various sizes and is shiftable longitudinally in the machine for the purpose of properly presenting the fields or columns of the record material to the groups of type wheels for printing.

Means is provided to control the presentation of the record material to the type wheels, so that several impressions may be made on one line, or the control may be adjusted to advance the record material either one or two spaces at each operation of the machine.

The last impression is visible to the operator at the end of the operation, and means is provided whereby the record material is shifted to the printing position and then returned to normal position within the operator's vision.

A bichrome ink ribbon is preferably used, means being provided under control of the well known total control lever on the register, to shift the ribbon on total and sub-total taking operations so that totals and sub-totals may be printed in one color and all other impressions made in another color.

A special shaft drives the novel printing mechanism, and manually-operated means is provided to disable the printer drive shaft at will.

A similar disabling mechanism is provided to disable the front printer, which is the well known front printer usually provided in machines of the type to which this invention is applied. This printer is adapted to print on a record strip retained in the machine, on an inserted slip, and on an issuing receipt. The amounts and other data printed by this mechanism are the same as those printed by the upper printer, and are set up under control of the various keys of the keyboard. Inasmuch as the front printing mechanism forms no part of the present invention, description thereof is omitted from this specification.

The machine has three lines of totalizers on which the amounts and values of the various transactions are distributed. These totalizers are the same as those disclosed in the above-mentioned patents to Fuller and to Shipley, to which reference is made for a complete description thereof.

The machine of the present invention is admirably adapted for use in preparing the multisectional statements of the various public utilities companies, but it is to be understood that by slight changes in certain of the mechanisms therein, the machine may be readily adapted to many other lines of business. Therefore, it is not intended to limit the invention to the precise structure and usage illustrated herein.

Keyboard

Figure 1:
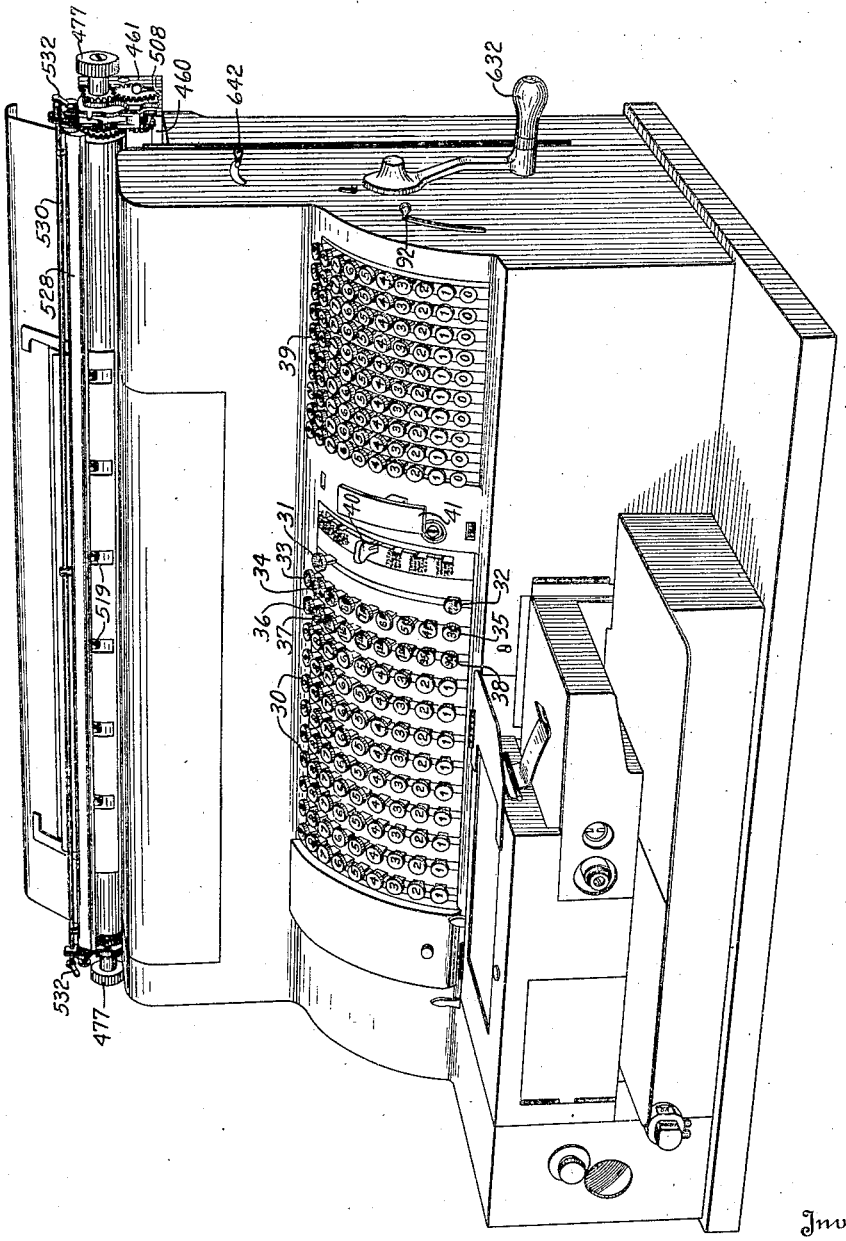
Fig. 1 is a perspective view of the entire machine encased in its cabinet.
Figure 2:
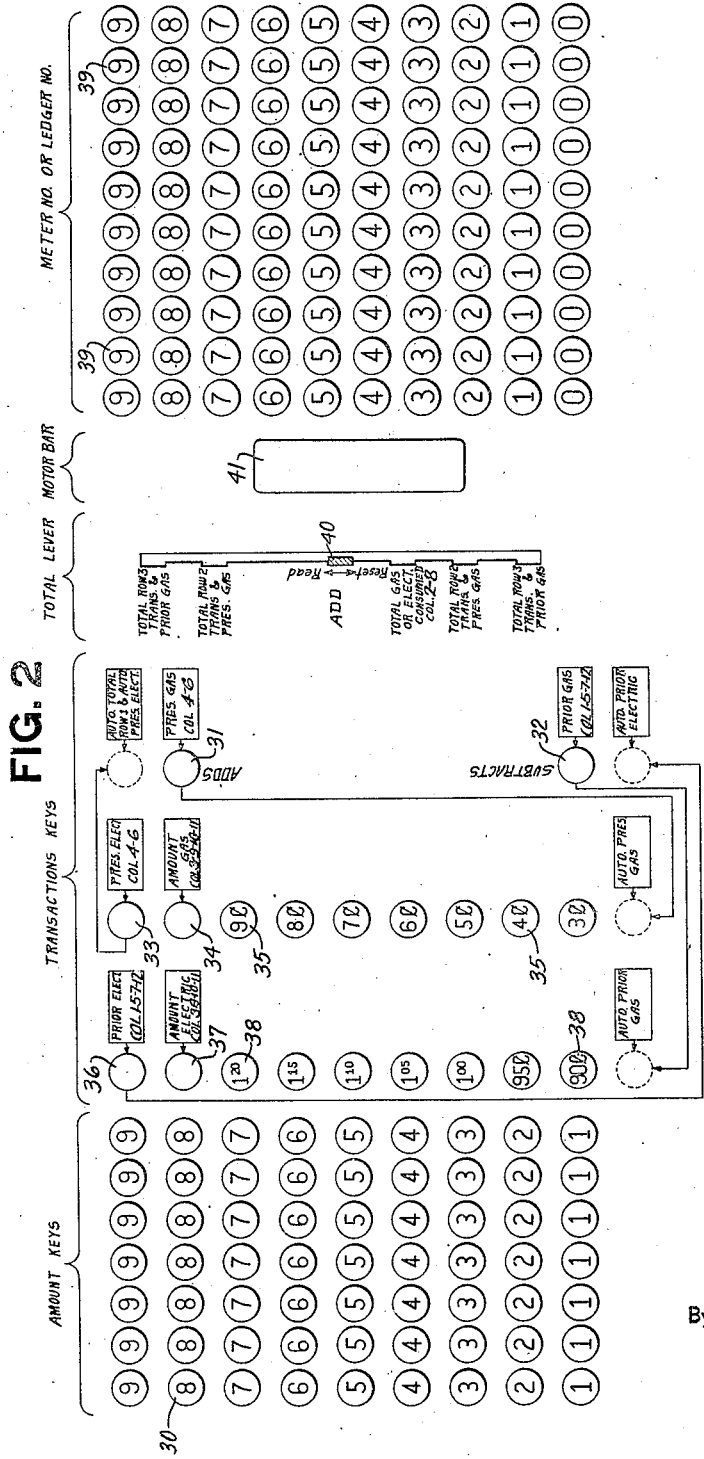
Fig. 2 is a diagrammatic plan view of the keyboard of the machine.

The keyboard of the machine with which the present invention is associated for illustration, includes a plurality of banks of amount keys 30 (Figs. 1, 2 and 3), a bank of transaction keys, which for present purposes may comprise a "present gas" key 31, (Figs. 1, 2 and 4) and a "prior gas" key 32, a second bank of transaction keys which, in the selected illustration, may comprise a "present electric" key 33, (Figs. 1 and 2), and "amount gas" key 34, and a plurality of electric rate keys 35, a third bank of transaction keys comprising, for example, a "prior electric" key 36, (Figs. 1 and 2), an "amount electric" key 37, and a plurality of gas rate keys 38, a plurality of banks of ledger number keys which, in this instance, are called "meter number" keys 39, (Figs. 1, 2 and 6), a total control lever 40 (Figs. 1, 2 and 11), and a motor release bar 41 (Figs. 1 and 2).

Amount keys

The amount keys 30 (Fig. 3) are of the usual type provided in machines such as are disclosed in the above-mentioned patents, and since they are fully described therein, only a brief description thereof will be included in the present application.

These keys are used to set up the amounts which are to be registered and printed. These amounts, in the present machine, may be the amounts of the present or prior readings of the gas or electric meters representing cubic feet of gas or kilowatt hours of electricity. The amount in dollars and cents due the company is also set up on the amount keyboard to be printed in the various columns and added into the totalizer provided for that purpose.

Figure 3:
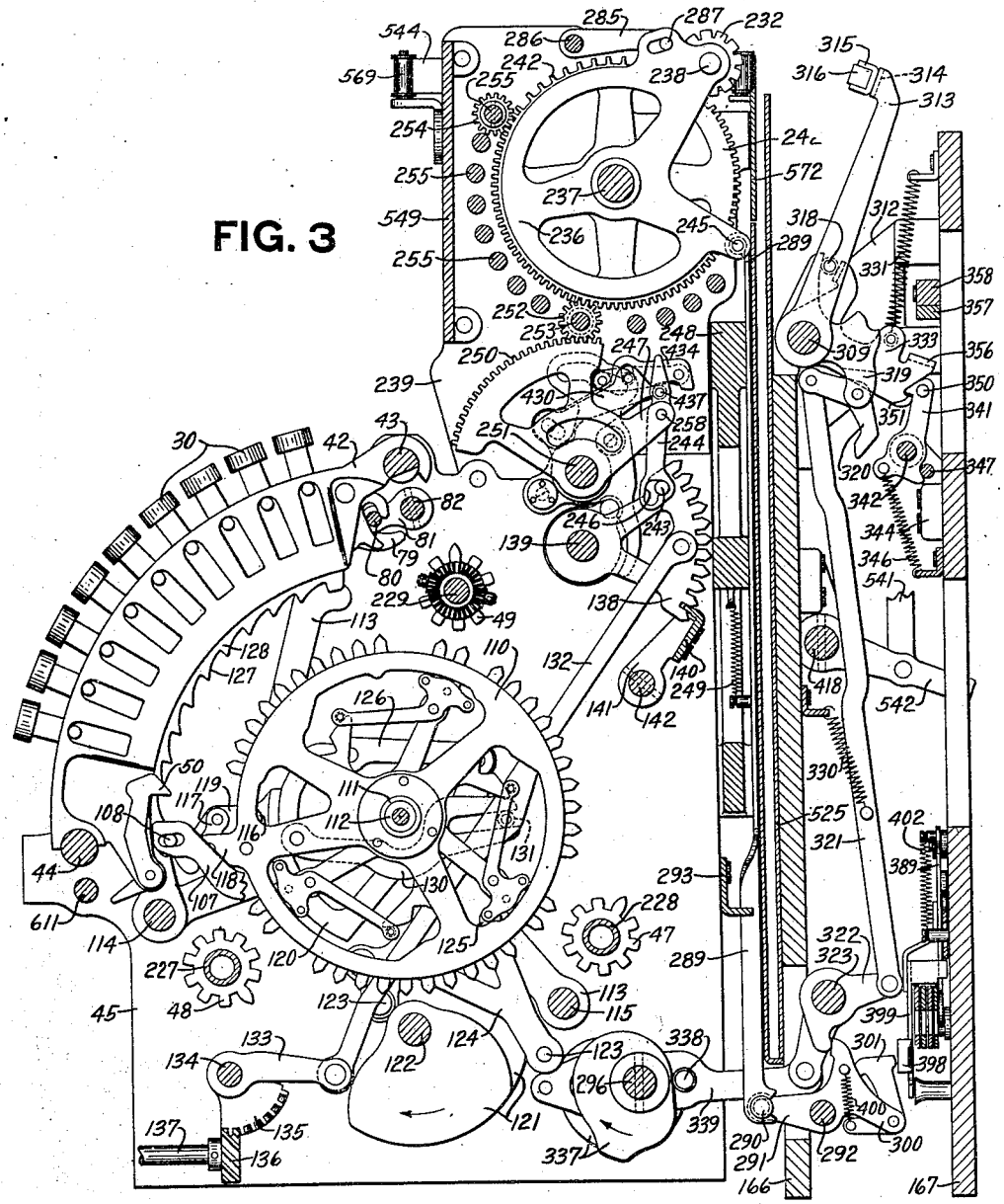
Fig. 3 is a vertical sectional view taken through the machine, immediately to the right of one of the banks of amount keys.
Figure 4:
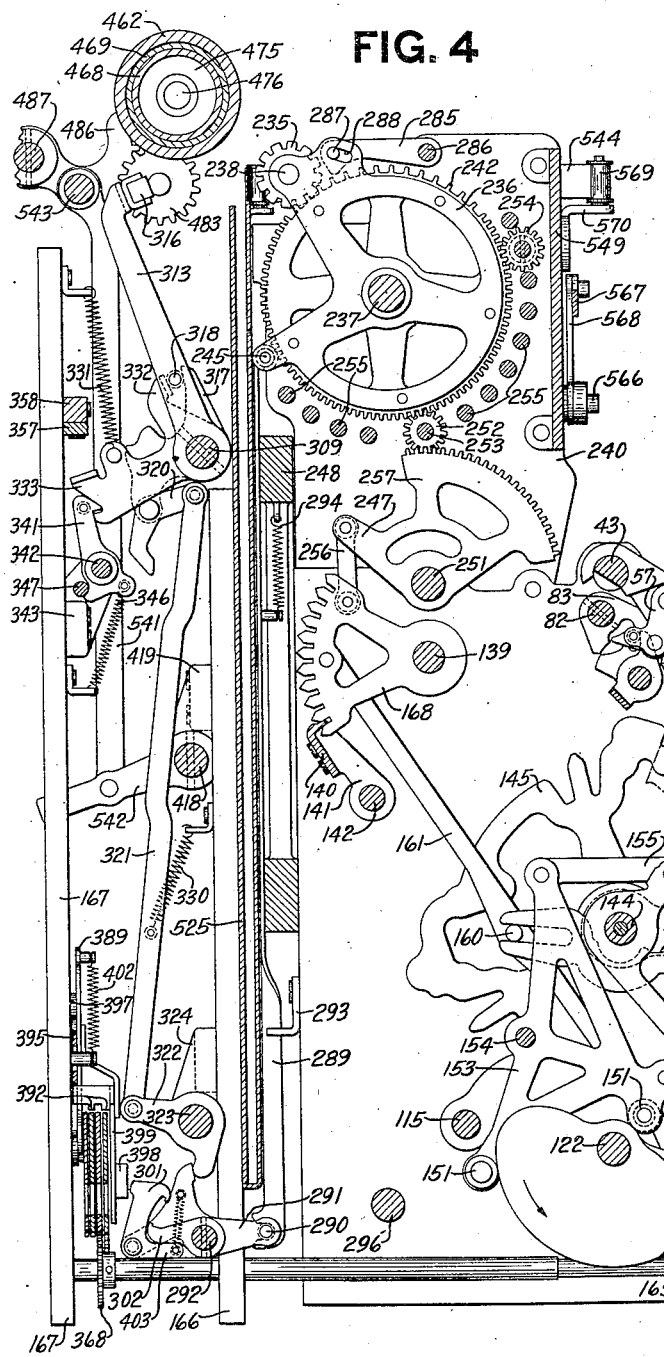
Fig. 4 is a vertical sectional view taken through the machine to the left of the first bank of transaction keys.

The amount keys 30 (Fig. 3) are not shown in detail in the drawings of this application, because they are old and well known in the art. The keys of each of the amount banks are mounted in a key frame 42 (Fig. 3) supported on cross rods 43 and 44 extending between side frames 45 (Fig. 3) and 46 (Fig. 4). A cross frame 248 joins the side frames 45 and 46 at the rear, thereby forming a rigid frame work for the machine.

The keys 30, when depressed, control the extent of movement of a differential mechanism, to be described later. When no key is depressed in the particular bank of keys shown in Fig. 3 and similar banks, it is necessary to provide means to arrest the differential in its "zero" position.

This means includes the usual zero stop arm 50 (Fig. 3), pivoted on the key frame 42 and normally occupying its effective position. Depression of a key 30 actuates a detent bar (not shown) to rock the stop arm 50 to its ineffective position. When the depressed key is released, as will be described hereinafter, a spring (not shown) restores the stop arm 50 to its effective position.

Transaction keys

The transaction keys are mounted in three separate key frames and will be described in the order from right to left as they appear in Fig. 2.

These transaction keys control the selection of the various totalizers in which the amounts are to be accumulated, and the selection of the columns in which the impressions are to be made. Also they control the selection and engagement of an adding and subtracting totalizer 49 of the type disclosed in the patent to Fuller, No. 1,242,170.

Only one bank (the first bank) of transaction keys is illustrated herein, the second and third banks being substantially the same, except that the second and third banks have their full complement of nine keys, whereas the first bank is provided with but two keys, namely, the "present gas" key 31 (Figs. 2 and 4) and the "prior gas" key 32.

The keys 31 and 32 (Fig. 4) are mounted in a key frame 51, similar to the key frame 42 for the amount keys. This frame 51 is also supported on the cross rods 43 and 44. The keys 31 and 32 carry projecting studs 52 and 53, respectively. Depression of one of these keys presses its stud against an inclined edge 54 or 55, respectively, on a detent bar 56 swung on links 57 and 58 to shift the detent bar downwardly. The links 57 and 58 are pivotally supported on the key frame 51.

The detent bar 56, when shifted downwardly, rocks the link 58 counter-clockwise against a stud 59 on a zero stop arm 60, to rock this stop arm clockwise to its ineffective position.

Springs (not shown) restore the transaction keys 31 and 32, when operated, in a manner to be described hereinafter.

These transaction keys, besides controlling the selection of the adding and subtracting totalizer, select certain columns in the upper printer, as will be described later.

The keys 33, 34 and 35 of the second bank, and the keys 36, 37 and 38 of the third bank of transaction keys are mounted in frames similar to the frame 51 (Fig. 4) for the first bank of transaction keys.

When it is desired to enter into the machine the present reading of the electric meter, the "present electric" key 33 in the second bank of transaction keys is depressed. This key 33 occupies the "ninth" or highest position in the keyboard. This amount is to be accumulated on the adding side of the adding and subtracting totalizer 49, controlled only by the keys 31 and 32 of the first bank of transaction keys. Since, however, no key in the first row is depressed on this operation, it is necessary to provide other means for shifting the zero stop arm 60 of the first transaction bank to its ineffective position to permit the differential arm 143 (Fig. 4) associated with the first row of transaction keys to rock in counterclockwise direction until arrested in the "ninth" position in a manner hereinafter to be described.

Figure 5:
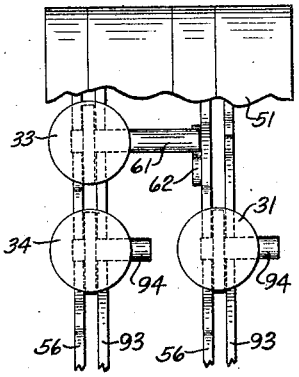
Fig. 5 is a fragmentary view of the uppermost keys in the first and second banks of transaction keys, illustrating the manner in which the uppermost key in the second bank of transaction keys controls the detent in the first transaction bank of keys.

To this end, the mechanism is so arranged that depression of the "present electric" key 33 forces an elongated stud 61 (Figs. 4 and 5) projecting therefrom, against the inclined edge of a block 62 fast on the detent bar 56 associated with the first transaction bank, which shifts the detent bar downwardly to rock the zero stop arm 60 to its ineffective position, out of the path of the differential arm 143.

After the bill has been computed, it is desired to print the amount of the bill in dollars and cents in the various columns on the statement assigned thereto, and to add the amount thereon into an amount totalizer.

The "amount gas" key 34 (Figs. 1, 2 and 4) is depressed to control the machine for operations in which the total amount of the bill is printed. This key 34 controls the selection of the proper column in the upper printer and controls the selection of the amount totalizer into which the amounts of the bills are accumulated.

The electric rate keys 35 of the second transaction bank are used in connection with the "amount electric" key 37 in the third transaction row of keys, to be described later, in order to classify the amounts of the bills for electricity according to the rate of charge per kilowatt hour. These rates may vary with the amount of current consumed, or for other reason.

In the third row of transaction keys is located the "prior electric" key 36, the "amount electric" key 37, and the "gas rate" keys 38. These keys all operate similar to the transaction keys of the second row. By use of the "prior electric" key 36, the "prior electric" meter reading set up on the keys 30 is accumulated on a totalizer selected under control of this key itself, and is also added to the negative side of the adding and subtracting totalizer 49. The key 36 also controls the selection of the proper column in which it is desired to print the "prior electric" meter readings.

The "amount electric" key 37, as explained above, is depressed in order to register the previously computed amount of the electric bill in a special amount totalizer.

The gas rate keys 38 of the third row of transaction keys are depressed in conjunction with the "amount gas" key 34 in the second row, to control the selection of the separate totalizers upon which is accumulated the amounts in dollars and cents of the gas bills falling under each of the ratings.

Meter number keys

The meter number keys 39 (Figs. 1, 2 and 7) located at the righthand side of the keyboard do not control the selection of totalizers nor the selection of columns. These keys merely control the differential mechanism to set up the meter number type wheels to correspond to the keys 39 depressed, whereby the meter number is printed both in the front printer and in a selected column of the upper printer.

The banks of meter number keys 39 (Fig. 7) are slidably mounted in key frames 63 supported on cross rods 64 and 65 extending between side frames 66 and 67 (Fig. 33) of the machine. These keys correspond with the ledger number keys of patent to Shipley, No. 1,619,796, heretofore referred to.

Depression of one of the keys 39 (Fig. 7) forces a stud 73 projecting therefrom against an inclined edge of a hook 74 on a detent bar 75 slidably mounted on studs 76 and 77 projecting from the key frame 63, which shifts the detent 75 towards the rear of the machine against the tension of the restoring spring 78. After the stud 73 has passed the end of the hook 74, the spring 78 restores the detent 75 to its normal position thereby locking the key 39 in its depressed position. When the depressed key 39 is released, as described below, a spring (not shown) restores it to its normal position.

Key release

Near the end of each operation of the machine, all of the depressed keys are released by mechanism now to be described.

Each of the banks of amount keys 30 (Fig. 3) is provided with a locking bar (not shown herein) to lock the operated keys in their depressed positions during the operation of the machine. The locking bar associated with the bank of amount keys illustrated in Fig. 3, is supported on a link 79. A bail 80 carried by arms 81 pinned to a release shaft 82, extends across the tails of the links 79 for all of the amount banks, to form a universal releasing mechanism for the banks of amount keys.

Near the end of the operation of the machine, the release shaft 82 rocks counter-clockwise under the control of means hereinafter to be described. The bail 80 on its counterclockwise movement with the release shaft, strikes the tails on the links 79 and rocks these links towards the front of the machine to shift the locking bars and release the depressed amount keys 30.

Similarly, a bail 90 (Fig. 7) carried by arms 91 pinned to the release shaft 82 traverses a cam slot formed in the upper end of each of the detent bars 75 to release the depressed meter number keys 39.

Each of the three banks of transaction keys is provided with a locking bar 93 (Fig. 5) which, after a transaction key is depressed, engages a stud 61 or 94 (as the case may be) thereon to hold the key in its depressed position.

Arms 83 (Fig. 4), one of which is pinned on the release shaft 82 opposite each of the banks of transaction keys, actuates the locking bar 93 for these banks to release the depressed transaction key when the release shaft 82 is rocked clockwise (as viewed in Fig. 4) near the end of the operation.

The mechanism for rocking the release shaft 82 to release the depressed keys in also shown in Shipley Patent No. 1,619,796, but will now be described briefly.

An arm 85 (Fig. 8), pivoted on a stud 86 in the side frame 46 carries a stud 84 which projects into a cam groove 87 formed in the side of a large gear 88 rotatably mounted on a screw stud 89 projecting from the side frame 46. The arm 85 also carries a stud 95 which extends into a shouldered aperture 96 in a link 97 slotted at its lower end to embrace a guide pin 99 in a pitman 100. An arm 102 pinned to the release shaft 82 carries a stud 101 which extends through a curved slot 103 in the upper end of the link 97. The stud 101 supports two identical spring retainers 104 disposed one on each side of the link 97. A spring 105 compressed between the retainers 104 and the bottom of the slot 103 constantly urges the arm 102 and the release shaft 82 in a clockwise direction (Fig. 8).

Machines of this type are released for operation by depressing the motor release bar 41 (Figs. 1 and 2). Depression of this bar operates mechanism not shown herein, which normally holds the release shaft 82 in the position shown in Fig. 8, to free the release shaft to the action of the spring 105 which expands and rocks the release shaft in a clockwise direction. This positions the stud 101 of the arms 102 in the upper portion of the curved slot 103.

The gear 88 receives one-half of one rotation in a counter-clockwise direction on each operation of the machine. Near the end of the operation, a node 106 of the cam groove 87 engages the stud 84 on arm 85 and rocks the arm clockwise. Due to the engagement of the stud 95 on the arm 85 with a shoulder in the opening 96 of the link 97, the arm 85 will draw the link 97 downwardly to rock the arm 102 and release shaft 82 counter-clockwise which releases the depressed keys in the manner above described.

In order to release a key depressed through error, a lever 92 (Fig. 1) is provided to manually operate the shaft 82.

*Differential mechanism*

The differential mechanisms provided in the machine of the present invention, are the same as those disclosed in the above-mentioned Shipley patent, No. 1,619,796. However, a brief description thereof will be given.

These differentials are employed in the present machine for the purpose of actuating and selecting the various totalizers of the machine, for setting up type wheels in both the front and the upper printer, and for selecting the column in which the impression is to be made. There is a complete differential unit for each of the banks of amount, transaction and meter number keys.

*Amount differential*

The differential units associated with the banks of amount keys are exactly alike. Therefore, but one of these units will be described.

The amount differential mechanism includes a substantially circular actuator 110 (Fig. 3), having a hub 111 journaled on a hollow stud 112 supported between a pair of stationary hangers 113, only one of which is shown herein. The hangers 113 are mounted on cross rods 114 and 115 extending between the side frames 45 and 46 of the machine. A link 116 and a bell crank 117 pivoted to a projection 118 of the actuator 110, pivotally support a latch 119 in such manner that it extends beyond the outer end of the projection 118. A spring, not shown, holds the foot or inner end of the latch 119 in engagement with a shoulder on an invariably movable drive segment 120. This drive segment 120 is given a constant excursion at each operation of the machine by a pair of cams 121, pinned to a drive shaft 122. The cams 121 co-operate with rollers 123 carried by an elbow lever 124 pivoted on a stud 125 on the stationary hanger 113. A link 126 connects the upper end of the elbow lever 124 with the drive segment 120.

The cams 121 (Fig. 3) make one complete rotation in a clockwise direction at each operation of the machine, to rock the elbow lever 124 first clockwise and then counter-clockwise to its normal position. The elbow lever 124, through the link 126, imparts a constant excursion to its drive segment 120 which carries the actuator 110 along, due to the latch connection. As the latch 119 is carried upwardly by the drive segment 120, the projecting end of the bell crank 117 strikes, and is arrested by the end of a depressed key, and continued advance of the drive segment 120 rocks the bell crank 117 counter-clockwise to disconnect the latch 119 and its actuator from the drive segment 120. As the latch disconnects from its drive segment, it enters its nose in a notch 127 in a serrated bar 128 supported at its lower end on the cross rod 114 and at its upper end of the hanger 113, to lock the differential mechanism in adjusted position. In those amount banks wherein no keys have been depressed, the arm 107 of a zero resetting spider (not shown) connected to the bell crank 117 by a stud 108, strikes and is arrested by the zero stop pawl 50 as the actuator 110 on its advance, arrives in its zero position, to effect the withdrawal of the latch 119 from engagement with its driver 120.

The driving segment 120, on its return movement, brings an inner surface thereof (similar to that shown in Fig. 4) into contact with a stud (similar to the stud 158, Fig. 4) on the actuator 110, to return the actuator to its normal home position, which is below the zero position.

As the shoulder on the driving segment 120 arrives opposite the foot of the latch 119 on the return travel of the segment, a spring (not shown) withdraws the latch from the notch 127 in the serrated bar 128 and re-engages the foot of the latch with the shoulder on the driving segment, so that the latch 119 and actuator 110 will be again rocked clockwise on the next operation of the machine.

To adjust the printing elements (not shown) of the front printer, and the printing element of the upper or column printer, a rearwardly extending beam 130 (Fig. 3) is pivoted at its front end to the differentially movable actuator 110. The rear end of the beam 130 is bifurcated to straddle a stud 131 mounted on a link 132, the lower end of which link is pivoted to an arm 133 journaled on a shaft 134 extending between the side frames 45 and 46 of the machine. A spiral segment gear 135 fast on the arm 133 meshes with a spiral pinion 136 fast on a printer shaft 137 extending into the front printing mechanism (not shown) for the purpose of adjusting the type elements. The upper end of the differentially adjustable link 132 is pivoted to a serrated segment 138 journaled on a shaft 139 supported in the side frames 45 and 46 of the machine. Obviously the differential adjustment of the actuator 110 is communicated to the printer shaft 137 and to the segment 138.

A universal aligner bar 140 (Fig. 3) having its free edge flanged to engage any of the serrations in the segment 138, is supported on a plurality of arms 141, pinned to an aligner shaft 142, mounted in the side frames of the machine. Any suitable means may be employed to operate the aligner 140.

Transaction differential mechanism

The differential mechanism controlled by the transaction keys 31 and 32 (Fig. 4) selects either the positive side or the negative side of the adding and subtracting totalizer. This differential mechanism also selects certain columns in the upper printer.

The differential mechanism for the transaction keys corresponds generally with that just explained, and includes an arm 143 (Fig. 4) pivoted on a hollow stud 144, supported between a pair of stationary hangers 145 (only one of which is shown herein). The hangers 145 are mounted on the cross rods 114 and 115, previously mentioned. An arm 146 and a bell crank 147 separately pivoted to the outer end of the differential arm 143, pivotally support a latch 148 in such a manner that it extends beyond the free end of the arm 143. A spring (not shown) holds the foot of the latch 148 in engagement with a shoulder on an invariably movable drive segment 149. This drive segment 149 is given a constant excursion at each operation of the machine by a pair of cams 150 pinned to the drive shaft 122. The cams 150 co-operate with two rollers 151 carried by a bell crank lever 153 pivoted on a stud 154 in the stationary hanger 145, which is omitted from Fig. 4. A link 155 connects the upper end of the bell crank lever 153 with the drive segment 149. The cams 150 rock the bell crank lever 153 first counter-clockwise, and then clockwise back to normal. The bell crank lever, through the link 155, imparts a constant excursion to its drive segment 149. As the latch 148 and its differential arm 143 are carried upwardly by the drive segment 149 the projecting end of the bell crank 147 strikes, and is arrested by, the corresponding zero stop arm 60, or the inner end of a depressed transaction key, and continued advance of the drive segment 149 will rock the bell crank 147 clockwise (as viewed in Fig. 4) to disconnect the latch 148 from the drive segment 149. At the same time, a nose on the latch 148 enters a notch 156 in a serrated bar 157, similar to the serrated bars 128 for the rows of amount keys, and supported in the same manner, to lock the transaction differential mechanism in its adjusted position.

As the driving segment 149 (Fig. 4) returns to normal position, an inner face thereon contacts with a stud 158 on the arm 143 and returns said arm to its normal position.

As the shoulder on the driving segment 149 arrives opposite the foot of the latch 148, a spring (not shown) withdraws the latch from the notch 156 in the serrated bar 157 and engages the foot of the latch with the shoulder on the driving segment, so that the latch 148 and arm 143 will be carried upward on the next succeeding operation of the machine.

To adjust printing elements (not shown) in the front printer and the printing elements in the upper printer, as well as to shift the adding and subtracting totalizer 49, a rearwardly extending beam 159 (Fig. 4) is pivoted at its front end to the differentially movable arm 143. The rear end of the beam 159 is bifurcated to embrace a stud 160 in a link 161 pivoted at its lower end to an arm 162 journaled on the shaft 137. A spiral segment gear 163 fast on the arm 162 meshes with a spiral pinion 164 pinned to a printer shaft 165. The shaft 165 is mounted at its forward end in a printer frame (not shown) and at its rear end is journaled in two back frames 166 and 167. This shaft controls mechanism for selecting the column in the upper printer in which the impression is to be made. The upper end of the link 161 is pivoted to a serrated aligner segment 168, swinging on the shaft 142, with which the universal aligner 140, described above, co-operates.

An auxiliary arm 169 pivoted at one end on the hollow stud 144 has its opposite free end lying in the plane of the zero stop 60, a slot in the free end of the auxiliary arm accommodating a stud 170 projecting from the bell crank lever 147. When no key in the corresponding transaction row is depressed, the arm 143, as it advances under the influence of the drive segment 149, carries with it the auxiliary arm 169 until the free end of the latter strikes, and is arrested by the zero stop 60, whereupon continued advance of the drive segment 149 will cause the disconnection of the latch 148 from the driver and lock the arm 143 and auxiliary arm 169 in the positions in which they were arrested by the zero stop 60.

Meter number differential

The differential mechanisms controlled by the several rows of meter number keys 39 (Fig. 7), differ somewhat from the differential mechanisms co-operating with the amount keys and the transaction keys. The differentially movable arm 143 (Fig. 4) of the differential mechanism for the transaction keys is returned to its home or normal position at the end of each operation of the machine. In the meter number differential mechanism now to be described, which co-operates with the keys 39 (Fig. 7), the differentially movable arm 176 assumes its neutral position only at the end of an operation wherein no meter number key is depressed. On operations wherein a meter number key is depressed, the differential remains in the position corresponding to the key depressed, until the next operation. The only duty of this differential is to adjust the type wheels (not shown) in the front printer, and the type wheels in the upper printer, under the control of the meter number keys.

There is a complete differential unit associated with each of the ten banks of meter number keys 39, and since these units are exactly alike, only one will be described herein.

This differential includes a differentially adjustable lever 176 (Fig. 7), pivoted on a shaft 177 journaled in the side frames 66 and 67. The foot of a latch 179 pivoted on a stud 180 at the forward end of the differentially adjustable lever 176, normally rests upon the arcuate edge of a drive sector 181 pinned to the shaft 177. The nose of the latch 179 engages any of a plurality of notches 182 in a serrated bar 183 fast on the key frame 63.

A pair of cams 184 secured to the drive shaft 122 co-operates with rollers 185 carried by a bell crank lever 186 pivoted on a stud 187 in the side frame 66. The cams 184 make one complete rotation in a clockwise direction at each operation of the machine to rock the bell crank lever first clockwise (Fig. 7) and then back to its normal position. The upper arm of the bell crank lever 186 carries a stud 188 accommodated in a bifurcated projection 189 of the drive sector 181 to rock this sector first counter-clockwise and then back to its normal position, as shown in Fig. 7.

It is to be understood that there is a drive sector 181 pinned to the supporting shaft 177 to co-operate with each of the ten banks of meter number keys 39. Only one of the sectors 181 is provided with a forked projection 189, but all of the sectors 181 rock with the shaft 177.

As the sector 181 rocks counter-clockwise, as just described, a shoulder 190 thereon comes opposite the foot of the latch 179, whereupon the latch, urged by a spring 191 rocks clockwise to engage the foot thereof with the shoulder 190. The spring 191 extends between an offset 192 of the lever 176 and one end of a by-pass pawl 193 pivoted on an arm 194 rigidly connected to the latch 179.

When the sector 181 rocks clockwise, it carries the latch 179 and lever 176 therewith until the outer end of the pawl 193 strikes and is arrested by the end of a depressed key, whereupon the pawl 193, arm 194 and latch 179 rock counter-clockwise as a unit to disengage the foot of the latch from the shoulder 190 on the sector 181, which continues its regular excursion.

On the counter-clockwise movement of the sector 181, a stud 195 thereon contacts the differential lever 176 at the point to which it was last adjusted and carries said lever therewith to its lowermost position. During this travel of the differential lever 176, the pawl 193 will yield as it passes beneath the inner end of a depressed key, should such key be of less value that that depressed on the previous operation. After passing beneath the inner end of such depressed key, the spring 191 will restore the pawl 193 to its normal position, as shown in Fig. 7.

The pawl 193 on its return or clockwise travel with the differential lever 176, strikes the end of a depressed key, or, if no key is depressed, continues its upward movement until it strikes a stud 196 in the bar 183, which disengages the latch from the sector 181, as described above. The stud 196 arrests the differential lever in its neutral position, and when in this position, the corresponding type wheel adjusted thereby presents a blank or non-printing face to the printing line.

The rear arm of the differential lever 176 has arms 203 and 210. A link 202 connects the arm 203 with a spiral segment gear 204 pivoted on a shaft 205 supported in the side frames 66 and 67. The segment gear 204 meshes with a spiral pinion 206, pinned to a shaft 207 supported in a frame 208. The shaft 207 adjusts a type wheel (not shown) in the front printing mechanism.

To set up the meter number type wheels, a link 209 connects the arm 210 with the rearwardly extending arm 211 of a segment gear 212, swinging on a shaft 213 supported in the side frames 66 and 67.

*Total control lever*

The total control lever 40 (Figs. 1, 2 and 11) normally occupies the "add" position, and when adjusted to any of its remaining positions, sets mechanism which, upon operation of the machine, controls the total and sub-total taking operations.

This lever is old and well known in this type of machine, and its functions are exactly the same as those of a similar lever illustrated and described in the above-mentioned patents. It is not, therefore, thought necessary to illustrate or describe the mechanism whereby movement of the total control lever 40 prepares the machine for total and sub-total taking operations.

However, the mere adjustment of the lever 40 from its "add" position to any of its total or sub-total taking positions, in the present machine, has the additional function of selecting certain mechanisms in the upper printer for effecting impressions in the desired columns on total and sub-total taking operations.

The total lever 40 projects from a substantially circular control plate 214 (Fig. 11) connected by a link 215 with an arm 216 pivoted on the shaft 137. A spiral segment gear 217 fast to the arm 216 meshes with a spiral pinion 218 pinned to a printer shaft 219 intermediate its ends. The printer shaft 219 extends forwardly into the front printer to set up type wheels (not shown) and also extends towards the rear of the machine. A segmental gear 225 (see also Fig. 25) pinned to the printer shaft 219 near its rear end, meshes with teeth on a rack 226 formed on the lower edge of a slide 377 to adjust the slide to a position corresponding to the position to which the total lever 40 is adjusted, thereby controlling mechanism to select certain columns in the upper printer, as will be described hereinafter.

*Totalizers*

The totalizers 47, 48 and 49 (Fig. 3) and the totalizer selecting and engaging means in the machine of the present invention, are the same as those disclosed in the patent to Shipley, No. 1,619,796, cited early in this specification. Therefore, no detailed description of the totalizers and their controlling mechanisms will be given herein.

The totalizers are mounted on three lines, including a tube 227, a tube 228 and a shaft 229, there being several totalizers arranged in interspersed relation on the respective tubes 227 and 228. The front line of totalizers mounted on the tube 227, are selected under control of the keys 36, 37 and 38 of the third transaction bank. The back line of totalizers on the tube 228, are selected under control of the keys 33, 34 and 35 of the second transaction bank. The front and back lines of totalizers each contain ten totalizers, any one of which may be selected under control of the nine keys and one selected by the zero stop arm of its respective transaction bank. The upper totalizer line 229 comprises an adding and subtracting totalizer 49 positioned under control of the keys 31 and 32, and the zero stop arm of the first transaction bank and under control of the key 33 in the second transaction bank, as explained above.

*Printing mechanism*

As mentioned previously, there are two printers in the machine herein disclosed. The front printer, illustrated in general in Fig. 1, is encased in the cabinet forming that part of the machine appearing in front of the keyboard. This printer is of the same type and construction as that illustrated and described in the above-mentioned Shipley patent, No. 1,619,796, to which reference may be had for a more complete description thereof.

*Column printer*

The novel printing mechanism, or column printer, is located at the top and rear of the machine and includes, generally, a plurality of groups of type wheels or carriers, and impression hammers associated with their respective groups to take impressions therefrom, together with mechanism to select the desired hammer or hammers, and means to adjust the type wheels under control of the keys depressed.

Figure 14:
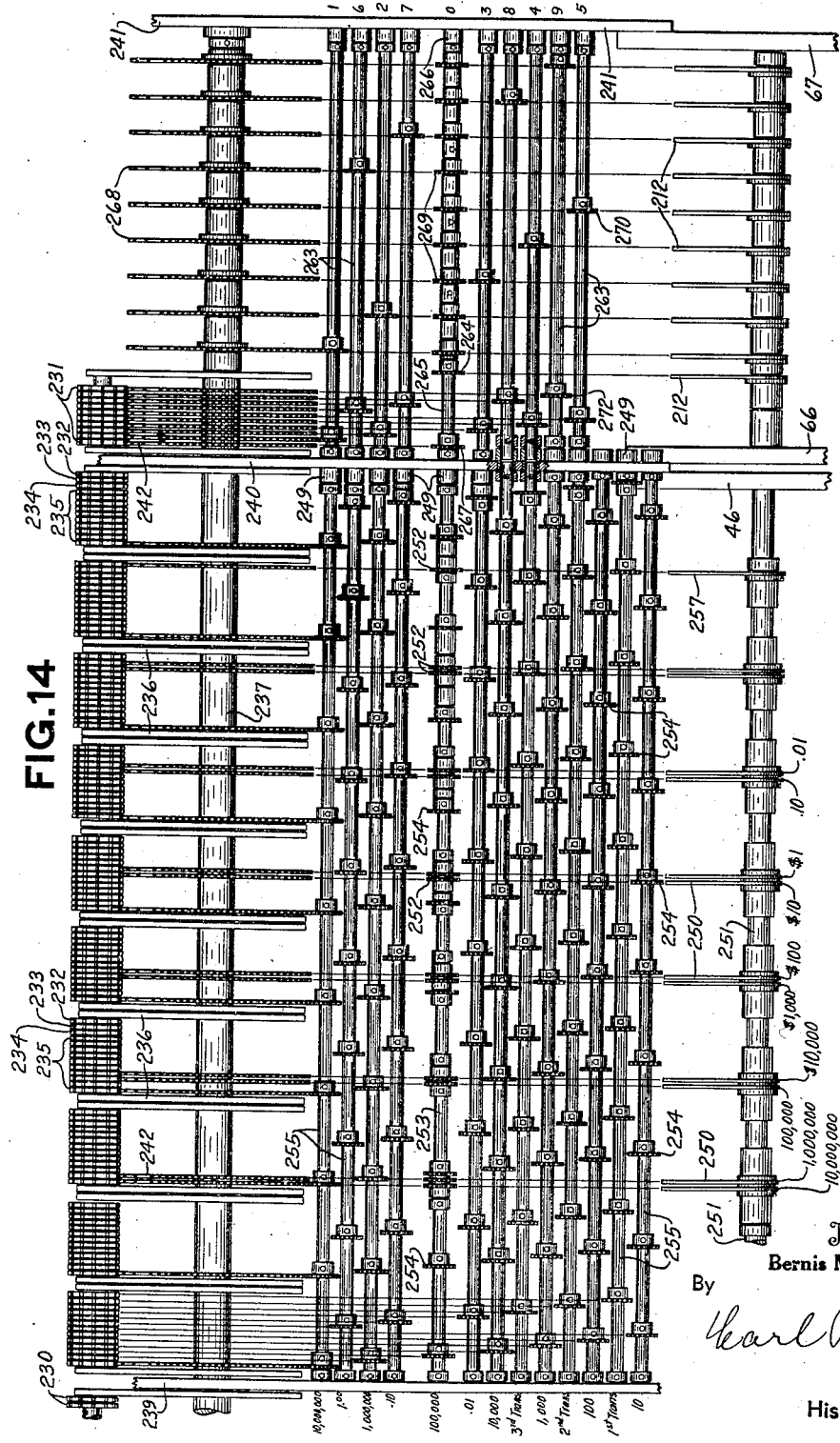
Fig. 14 is a diagrammatic plan view illustrating the manner of adjusting the type wheels in the several columns simultaneously.

Specifically, there are twelve groups of type wheels, one of which, as the group on the extreme left of Fig. 14, is manually adjusted in any convenient manner to print the date. That group of type wheels on the extreme right of Fig. 14, is adjusted under control of the meter number keys 39. The remaining groups of type wheels, ten in number, are all adjusted simultaneously under control of the amount keys 30 and of the particular transaction keys depressed.

The type wheel 232 (Fig. 14) of each of the last-mentioned groups, is set under control of the keys 31 and 32 of the first transaction bank; the next type wheel to the left, 233, is controlled by the keys 33, 34, 35 of the second transaction bank, and the next type wheel 234 is controlled by the keys 36, 37, 38 of the third transaction bank. The remaining ten wheels 235, of each of these groups, are the amount type wheels and are adjusted under control of the amount keys 30.

The manner of supporting the transaction type wheels 232, 233 and 234 and the amount type wheels 235, and the manner in which they are set up under control of the transaction and amount keys, will now be described.

Since the several groups of amount type wheels are exactly alike, but one group will be described.

A pair of rocking members 236 (Figs. 3, 4, 6 and 14) journaled on a rod 237, extending the entire length of the machine, are tied together by a rod 238, upon which are mounted the type wheels 232, 233, 234 and 235, to form a rocking frame for the group of type wheels. The brackets 239 (Fig. 3) secured to the left side frame 45, 240 (Figs. 7 and 8) secured to the intermediate frame 46 (Fig. 4), and 241 secured to the side frame 67 (Fig. 14), support the rod 237. Large gears 242 (Figs. 3, 7 and 20), journaled on the rod 237 mesh with the type wheels 232—235. These gears 242 are differentially adjusted under control of the depressed transaction and amount keys. It will be remembered that the serrated aligner segments 138 (Fig. 3) for the amount key banks are differentially positioned according to the values of the amount keys 30 depressed. A stud 243 in each of the aligner segments 138 projects through an angular slot 246, (the purpose of which will be described later) in the lower end of a link 244. The link 244 is pivoted intermediate its ends to the rearwardly extending arm 247 of a segmental gear 250 journaled on a shaft 251 extending between the bracket 239 (Fig. 3) and the intermediate frame 46 (Fig. 14). Thus, through the link 244, the segmental gear 250 is differentially positioned under the control of the amount keys 30.

There is a segmental gear 250 (Figs. 3 and 14) for each of the amount banks and one for an overflow bank. Each of the segmental gears, but one, meshes with its denominational idler or intermediate pinion 252 journaled on a single shaft 253, which is one of a series of universal shafts 255 arranged circumferentially about the group of type wheel gears 242, and supported at their opposite ends in the bracket 239 and in bearings 249 (Fig. 14) in the bracket 240. Each of the idler pinions 252 meshes with its denominational type wheel gear 242 which, in turn, meshes with a pinion 254 fast on its particular denominational shaft 255. Thus each of the segmental gears 250 drives one of the circumferentially arranged universal shafts 255 through a pinion 252 and gear 242. For instance, the upper one of the universal shafts 255 (Fig. 3), which is the bottom shaft as shown diagrammatically in Fig. 14, is actuated by the gear 242, the pinion 254, and the segmental gear 250 for the tens of dollars bank of amount keys shown in Fig. 3. A pinion 254 for the tens of dollars type wheels in each of the amount type wheel groups, is fast on the upper universal shaft 255. Each of the pinions 254 meshes with a type wheel gear 242, which in turn meshes with the related type wheel 235 in each of the groups of type wheels. Likewise, each of the remaining universal shafts 255 sets up a type wheel in each of the groups of amount type wheels simultaneously upon operation of the machine.

In the diagrammatic view shown in Fig. 14, the universal shafts 255 are spread out in the same plane, in order to show the echelon arrangement of the pinions 254 on the universal shafts and of the idler pinions 252 on the shaft 253.

The segmental gear 250 for the hundred thousand dollar bank of amount keys does not mesh with an idler pinion 252 on the shaft 253, but meshes with a pinion 254 pinned to the shaft 253, to directly drive this shaft. Other pinions 254 fast on the shaft 253 mesh with the hundred thousand dollars type wheel gears 242 for each of the corresponding amount type wheels 235.

The transaction type wheels 232, 233 and 234 (Figs. 4 and 14) in each of the type wheel groups are set up in a manner similar to that in which the amount type wheels are set up, as just described.

There is a universal shaft 255 for each of the three banks of transaction keys. A plurality of pinions 254, one for the particular type wheel of each group, are fast on each of the shafts 255 for the three banks of transaction keys. These pinions 254, as in the amount banks, mesh with type wheel gears 242, which in turn, mesh with the particular type wheels in each group.

A link 256 (Fig. 4) connects the respective serrated segments 168 for the transaction banks with rearwardly extending arms 247 on their corresponding segmental gears 257 pivoted on the shaft 251. The segmental gears 257 for the banks of transaction keys are the same as the segmental gears 250 for the banks of amount keys.

The segmental gears 257 drive type wheel gears 242 through idler pinions 252 journaled on the shaft 253. The type wheel gears 242 drive pinions 254 fast on the corresponding universal shafts 255. The universal shafts 255 through the plurality of pinions 254 fast on each shaft, meshing with the corresponding type wheel gears 242, sets up the particular type wheels 232, 233, or 234 in each of the type wheel groups just as each amount type wheel 235 is adjusted.

*Meter number type wheels*

The mechanism whereby the meter or designating number type wheels 231 (Figs. 7 and 14) are set up under control of the meter or designating number keys 39 (Figs. 1 and 7) is similar to that just described for the amount and transaction type wheels. There is, however, but one group of meter number type wheels.

Two rocking members 236 pivoted on the rod 237 and joined by a rod 245 supporting the designating type wheels 231, form a rocking frame for the group of designating type wheels. A separate type wheel gear 242 meshes with each of the ten meter number or designating type wheels.

It will be remembered that the segmental gear 212 (Fig. 7) is differentially positioned according to the value of the particular meter number key 39 depressed, at each operation of the machine. The particular segmental gear 212 appearing in Fig. 7 drives a pinion 264 fast on a shaft 265 which is one of a group of ten universal shafts 263, 265 circumferentially arranged about the set of type wheel gears 242. A pinion 267 (Fig. 14) also fast on the shaft 265 meshes with a type wheel gear 242 to set up the particular meter number type wheel under control of the key 39 (Fig. 7).

The shafts 263, 265 are supported at their ends in bearings 249 in the brackets 240 and in bearings 266 in the bracket 241.

The remaining nine segmental gears 212 (Fig. 14) drive the type wheel gears 268 through idler pinions 269 journaled on the shaft 265. Each of the type wheel gears 268 meshes with a pinion 270 fast on its particular universal shaft 263. Pinions 272 fast on the universal shafts 263 near their lefthand ends, as viewed in Fig. 14, mesh with the type wheel gears 242, to transmit the differential movements of the segmental gears 212 to their corresponding meter number or designating type wheels 231.

Date type wheels

The date type wheels 230 (Figs. 14, 20 and 21) are manually adjusted by means of knurled knobs 273 formed on the ends of nested sleeves 274 surrounding a stud 275 projecting from the left side of the machine, the inner end of the stud being secured to the bracket 239. The date printing type wheels 230 are mounted on a rod 238 supported in two spaced rocking members forming a frame 236 pivoted on the rod 237. Pinions 276 fixed on the righthand ends of the sleeves 274, as viewed in Fig. 21, mesh with type wheel gears 242, which in turn mesh with the date type wheels 230, to adjust said type wheels according to the position to which the knurled knobs 273 are adjusted. Spring-pressed pawls 277 mounted in a holder 278 secured to the bracket 239, engage the teeth of the gears 276 to align the sleeves and knurled knobs in their adjusted positions.

Printing mechanism

In that form of the invention herein illustrated, there are as many sets or groups of type wheels as there are columns on the form or sheet of paper to be printed upon, although it is obvious that the platen and its carriage hereinafter described, which supports the paper could be arranged for endwise travel like the well-known paper carriages for typewriting machines, which would enable the use of a form or sheet having a larger number of columns.

The several rocking type wheel frames 236 normally lie retracted at that end of their travel remote from the printing line, to avoid smudging the paper opposite the idle groups of type wheels during the printing operations, and also to normally prevent contact between the type wheels and the ink ribbon, which would tend to wear the ribbon as it is fed step by step.

However in effecting an imprint in the particular column or columns desired, the type wheel frames 236 are rocked counter-clockwise (Fig. 4) to bring the selected type faces to the printing line, and into the paths of the impression hammers individual to the groups of type wheels, and closer to the inking ribbon.

The type wheel frames are individually shiftable, and each is operated by similar mechanism, which will now be described.

A gear 636 (Fig. 8) fast on the drive shaft 122, meshes with an intermediate pinion 637 turning on a stud 638 which pinion meshes with a gear 639 journaled on a universal printer shaft 296. A driving pawl 652 pivoted on the gear 639 engages a shoulder formed on a collar 653 fast on the printer drive shaft 296 to turn the shaft in clockwise direction, as viewed in Fig. 8. A second pawl 654 likewise pivoted on the gear 639, normally engages a second shoulder on the collar 653 to arrest the printer drive shaft 296 at the end of each operation. A spring 655 holds the pawls 652, 654 in effective positions.

The printer drive shaft 296 is suitably supported in bearings in the side frames 45, 46, 66 and 67 (Fig. 33). A pair of cams 295 (Fig. 17) pinned to the shaft 296 intermediate its ends, cooperate with rolls 297 on a pitman 298 slotted to embrace the printer drive shaft 296. The cams 295 operate to reciprocate the pitman 298, the outer end of which is pivoted to an arm 299 fast on a rock shaft 292 supported in hangers 282, 283 and 284, secured to the rear of frame 166 (Figs. 19—A and 19—B).

Levers 291 (Figs. 3, 4, 17 and 25) are journaled at intervals along the rock shaft 292, there being as many levers 291 as there are groups of type wheels. The levers are located immediately below their corresponding groups of type wheels, and each carries a laterally projecting pin 290 embraced by the lower recessed end of a link 289, the upper end of which is connected to the tie rod 245 extending between the rocking plates 236 of its respective group of type wheels. Notched guides 293 extending between and secured to the side plates 45, 46 (Figs. 3 and 4) guide the links 289 in their vertical movement, and springs 294 urge the links upwardly to hold the rocking type wheel frames 236 and the sets of type wheels carried thereby in retracted positions.

In an operation of the machine, the cams 295 make a complete rotation in clockwise direction to reciprocate the pitman 298 and rock the shaft 292 first clockwise, and then counter-clockwise as viewed in Fig. 17.

Each lever 291 has a rearwardly extending arm 300 (Fig. 17) pivotally supporting a hooked pawl 301 lying in the path of its respective finger 302 of a series of fingers fast on the shaft 292.

As the shaft 292 and its fingers 302 rock in counterclockwise direction, as viewed in Fig. 17, and clockwise as viewed in Fig. 4, the ends of the fingers will contact the hooked ends of their respective pawls 301, to draw the pawls in like direction and rock the several levers 291, to lower the links 289 and rock the several type wheel frames 236 to advance the type wheels of the several groups to the printing line and towards the ink ribbon.

Type wheel aligners.

Means is provided to insure the proper alignment of the type faces of the type wheels composing each group, and to lock the type wheels against accidental movement, after adjustment and advantage is taken of the rocking action of the respective type wheel carriers 236 in obtaining the above-mentioned results.

To these ends, a separate type wheel aligner 285 (Figs. 3, 4, 6, 7 and 15) is provided for each group of type wheel gears 242. Each aligner is pivoted on a universal rod 286 supported in the brackets 239 and 240. The nose of each aligner 285 fits between the rocking frames 236 of its respective group of type wheel gears and across all the type wheels in its group. Studs 287, one on each end of each aligner 285, project through inclined slots 288 formed in the rocking type wheel frames 236. As the type wheel frames 236 rock counterclockwise (as viewed in Fig. 4), the frames, due to the angle of the slots 288 therein, cam the studs 287 downwardly and rock the aligners 285 counter-clockwise about their pivots to engage the noses thereof between the teeth of the type wheel gears 242, subsequently to the adjustment of the gears, thereby aligning the gears, and consequently the type wheels, in their adjusted positions during the time the impression is being made. After the impression has been made, the type wheel frames 236 are rocked clockwise back to their normal positions, thereby raising the aligners 285 from engagement with the type wheel gears 242, which are then free to be adjusted on the next operation of the machine.

The counter-clockwise movement of the type wheel frames 236 carries the type wheels 235 therewith, and, due to the engagement of the type wheels with the teeth on the gears 242, the type wheels are turned one step in counter-clockwise direction, as viewed in Fig. 4, relatively to the locked type wheel gears 242, to present the proper characters to the printing line. Hence the type wheels are adjusted under control of the depressed keys to bring the corresponding type faces to points one step removed from the printing line, and the operation of printing advances the type wheels one step to bring the desired types to the printing line.

After the impression has been made, in the manner to be later described, the cams 295 (Fig. 17) shift the pitman 298 to the right to rock the shaft 292 clockwise and restore the fingers 302 to their normal positions. As this occurs, the springs 294 attached to the links 289 raise the links and rock the type wheel frames 236 counter-clockwise, to restore the type wheels and the type wheel aligners 285 to their normal retracted positions. As viewed in Fig. 17, the cams 295 have advanced from their normal positions to a point where the fingers 302 are about to contact the hooked ends of the pawls 301. The fingers 302 normally assume the positions shown in Fig. 4 at the end of each operation of the machine.

*Printing hammer*

The impression means for the column printer includes an individual hammer for each of the groups of type wheels. These hammers are pivoted on a shaft 309, journaled in three brackets 310 and 311 (Fig. 19—A) and 312 (Fig. 19—B), secured to the back frames 166 and 167 (Fig. 3).

Since the structure and operation of each of these hammers is alike, only one will be described herein. Each impression hammer includes a bail 313 (Figs. 3, 4, 17, 19—A and 19—B) pivotally mounted on the shaft 309. A U-shaped holder 315 secured to the cross bar 314 of the bail, supports a platen 316 adapted to strike sharply against the record material and force it against the type faces at the printing line to take an impression therefrom, under the influence of a drive spring 331. The drive spring 331 is connected to one arm of a bell crank lever 333 pivoted on the shaft 309, the remaining arm 332 of which carries a laterally bent ear constantly pressed by the tension of the spring against a rod 318 connecting the arms 313 of the hammer bail.

The several hammers appertinent to their respective groups of type wheels are held in retracted position as follows:

A pair of cams 337 (Fig. 16) fast on the printer drive shaft 296 co-act with studs 338 projecting from a pitman 339 slotted to embrace the printer shaft 296. The pitman 339 is pivotally connected to an arm 340 fast on an intermediate shaft 323 journaled in brackets 324, 325 (Fig. 19—A) and 326 (Fig. 19—B) on the back plate 166. A link 334 connects another arm 336 fast on the intermediate shaft 323, with an arm 335 fast on the hammer restoring shaft 309.

Elbow levers 317 (Figs. 16, 17, 19—A and 19—B) are secured at spaced intervals along the restoring shaft 309 at points between the arms of the respective hammer bails 313, an upwardly projecting arm of each elbow lever being adapted to lie in the path of and contact the rod 318 extending between the arms of each hammer bail 313.

Normally the cams 337 hold the pitman 339 in its forward position, which, through the linkage connecting the pitman with the restoring shaft 309, maintains the restoring shaft in its extreme clockwise limit of rotation (viewing Fig. 16) to hold the upwardly projecting arms of the restoring levers 317 against the rods 318 to retain the hammers in their retracted positions against the tension of the drive springs 331.

At each operation of the machine, the cams 337, though the pitman 339 and the linkage connecting it with the restoring shaft 309, rocks the restoring shaft and the restoring levers 317 thereon, first counter-clockwise (Fig. 16) to release the hammers to the actions of their drive springs 331, and then clockwise back to their normal positions, to retract the hammers, which are thus held normally in cocked or set positions.

The universal restraining and restoring mechanism above explained, releases all the printing hammers in a body, for operation and restores them to retracted positions, and in order to permit the operator to select the particular hammer or hammers which are to become effective on any operation of the machine, in a manner hereinafter set forth, an individually operable restraining means is provided for each hammer.

To this end, a plurality of retaining pawls 341 (Fig. 17) are pivotally mounted on a transversely extending rod 342 supported in brackets 343, 344 (Fig. 19—A) and 345 (Fig. 19—B) secured to the back frame 167, each retaining pawl 341 being hooked to normally take over a shoulder 351 (Fig. 16) on the rearwardly projecting arm of each driving bell crank 333 to which is connected the drive spring 331 of each hammer, and thus restrain the drive springs against operation, even though the restoring arms 317 have released the hammers. Springs 346 tend to yieldingly hold the retaining pawls 341 in effective position. A limiting rod 347 supported in brackets 343, 344 and 345 (Figs. 19—A and 19—B) extends beside the tails of the retaining pawls 341 to prevent the springs 346 from rocking the pawls too far when freed from the trip or release levers 320.

Mechanism is provided to disable the respective retaining pawls 341 as follows:

A trip or release lever 320 (Fig. 17) is pivotally supported intermediate its ends to each of the rearwardly extending arms 319 of the restoring elbow levers 317, the free end of each trip or release lever 320 having a beveled edge 349 lying adjacent a pin 350 projecting laterally from each of the individual restraining pawls 341. Links 321 connect each trip or release lever 320 with one arm of a bell crank lever 322 appropriate thereto. The bell cranks 322 are pivotally mounted on the cross shaft 323. The remaining arms of the bell crank levers 322 lie in contact with projections 348 on the respective coupling levers 291 heretofore referred to as rocking the type wheel carriers to and from their printing positions. Springs 330 connected to their respective links 321 urge the links upwardly to retain the levers 320 in idle position.

During the operation of the machine, the shaft 296 (Fig. 17) and its cams 295 rotate to actuate the pitman 298 and rock the shaft 292 and its fingers 302 as heretofore explained.

As the fingers 302 rock the coupling levers 291 counter-clockwise to lower the links 289 and rock the type wheel frames 236 to bring the type wheels to the printing line, the projections 348 on the coupling levers 291 rock the bell crank levers 322 clockwise on the shaft 323, to lower the links 321 and rock the tripping or releasing levers 320 counter-clockwise from the positions shown in Fig. 16 to that shown in Fig. 17. Shortly thereafter the cams 337 (Fig. 16) impart the final counter-clockwise rotation to the restoring shaft 309 to rock the arms 319 of the restoring levers 317 farther in a counter-clockwise direction. This movement presses the beveled edges 349 of the trip or release levers 320 against the studs 350 of the retaining pawls 341 and rocks the pawls clockwise to disengage their hooks from the shoulders 351 of the driving bell crank levers 333, whereupon the drive springs 331 rock the bell crank levers sharply counter-clockwise to impel the hammers against the type wheels.

The counter-clockwise travel of the driving bell crank levers 333 (Fig. 17) is limited by an ear 356 on each lever adapted to contact an arresting bar 357 composed of fibre or other sound deadening material secured on the bottom of a supporting bar 358 fastened to and extending across the rear frame plate 167.

After the impression has been made, the cams 337 (Fig. 16) shift the pitman 339 to the left, which through the linkage connected thereto, rocks the shaft 309 and the restoring levers 317 clockwise. The restoring levers contact their respective rods 318 to restore the hammers 313 and the bell crank levers 333 to the positions shown in Fig. 16, in readiness to be tripped to make another impression.

Rebound preventing means is provided for the hammers, comprising a locking plate 59 (Figs. 16, 17, 30, 31 and 32) pivotally supported on the bell crank lever 333 and spring-urged in a counter-clockwise direction. The locking plate 59 is shown in Fig. 16 in its normal position. It will be remembered that before the bell crank lever 333 is tripped to operate the hammer, the shaft 309 rocks the arm 319 counter-clockwise. A shoulder 360 on this arm 319 engages a stud 361 on the locking plate 359 and turns said plate clockwise about its pivot on the bell crank lever 333 to the position shown in Figs. 17 and 30. Shortly thereafter, the bell crank lever 333 is tripped and the spring 331 rocks said bell crank, the hammer and the locking plate 359 forward until the ear 356 strikes and is arrested by the bar 357. When this occurs, the inertia of the locking plate 359, aided by a spring 362 rocks said plate counter-clockwise to disengage a hook 363 thereon from the rod 318. Simultaneously the impetus given the hammer by the spring 331 carries it forward to strike the type wheels. At the same time the tip of a hook 364 on the locking plate 259 strikes the top of the rod 318, as shown in Fig. 31.

The elasticity of the platen 316 as it strikes the type wheels, rocks the hammer clockwise carrying the rod 318 into contact with a cam surface 365 formed on the plate 359 between the hooks 363 and 364. The cam surface 365 is so shaped that when the rod 318 is carried sharply into contact therewith, said rod cams the locking plate 359 farther counter-clockwise to engage the hook 364 with the rod 318 to prevent the hammer from rebounding against the tension of the spring 331.

Shortly after the hammer-rebound preventing mechanism functions, the hammer is restored to its normal locked position by the lever 317, as described above.

Hammer selection

The columns in which the printing is to be effected are selected under control of the transaction keys. The several groups of type wheels, however, are set up simultaneously, the selection of the columns being accomplished by determining which of the hammers is to be operated.

It will be remembered that the shaft 165 (Fig. 4), which is differentially positioned under control of the first bank of transaction keys, extends to the rear of the machine and is supported in the back frames 166 and 167. A shaft 366 and a shaft 367 (Figs. 19—A and 25) controlled by the keys of the second and third banks of transaction keys respectively, also extend to the rear of the machine. A segmental gear 368 pinned to the shaft 165 meshes with a rack 371 formed on the lower edge of a selecting slide 372 (see also Fig. 13). Likewise, segmental gears 369 and 370, secured to the shafts 366 and 367 respectively, mesh with racks 373 and 374, respectively, formed on the lower edges of the selecting slides 375 and 376, respectively. The segmental gear 225, fast to the shaft 219 for the total control lever 40, meshes with the rack 226 formed on the lower edge of a selecting slide 377.

The selecting slides 372, 375, 376 and 377 (Figs. 19—A, 19—B and 25) are slidable longitudinally in the machine on a plurality of rods 378 extending between the frames 166 and 167. The rods 378 carry spacer washers 379 to space the slides apart the proper distance. Two studs 385 and 386 support a plurality of guide strips 387 which hold the racks 226, 371, 373 and 374 in mesh with their respective segmental gears. The segmental gears and the racks just described, position the selecting slides differentially under control of the transaction keys and the total control lever. Each of these selecting slides has a series of notches cut in the upper edge thereof, the purpose of which will be presently described.

A rocking feeler frame 388 (Figs. 19—A and 25) pivoted on a vertical slide 389 supported on the frame 167 by studs 390 and 391, carries sets of feeler fingers 392 and 393 (Figs. 26 to 29), which co-operate with notches formed in the upper edges of the horizontal slides 372, 375, 376 and 377, to control the selection of the impression hammers. A bracket 394 fastened on a slide 389 supports the rocking feeler frame 388 at its forward side. There is one of these feeler frames for each of the several hammer control units. A universal cam plate 395 (Figs. 19—A and 19—B and 25) slidably mounted on a plurality of studs 396 in the frame 167, co-operates with a roller on each of the vertical slides 389 to hold the rocking feeler frame normally in its uppermost position, with the feeler fingers clear of the horizontal slides. With the feeler frame 388 in its uppermost position, a conveniently bent ear 398 carried by an arm 399 projecting downwardly from the rocking frame 388 normally lies directly behind and in the same plane with the pawl 301. In this position, the ear 398 prevents the pawl 301 from rocking clockwise, as viewed in Fig. 17, under influence of a spring 400 when the finger 302 is actuated as above described.

After the horizontal selecting slides have been positioned under control of the transaction keys and the total control lever, the cam plate 395 is moved to the right as viewed in Fig. 25, and to the left as viewed in Figs. 19—A and 19—B, to remove cams 401 thereon from beneath the rollers 397 whereupon springs 402 lower the slides 289 and the feeler finger frames 388. If on the downward movement of the frame 388, the fingers 392 and 393 thereon find faces of equal height, the ear 398 will maintain its position in the plane of a pawl 301, which will thereby be prevented from rocking clockwise, as viewed in Fig. 17, out of the path of the finger 302. In Fig. 26, the frame 388 is shown in its lowered position, with the fingers 392 and 393 in engagement with notches of equal height. In this position the pawl 301 will be engaged by the finger 302 to rock the lever 291 and position the type wheels to the printing line, and to trip the hammer associated with the particular feeler finger frame, just described.

If, however, when the slide 389 and the feeler finger frame 388 are lowered, as above described, the fingers 392 and 393 find faces of unequal height, the frame 388 will be rocked either clockwise or counter-clockwise to swing the ear 398 out of the plane of the pawl 301. Then as soon as the finger 302 is rocked counter-clockwise, the spring 400 rocks the pawl 301 clockwise, as viewed in Fig. 17, out of the path of the finger 302, in which position the finger 302 will not engage the pawl 301 on its counter-clockwise movement. On its return movement, the finger 302 contacts an arm 403 of the pawl 301 and restores the pawl to its normal position with the hook thereon in the path of the finger 302. As shown in Fig. 4, the finger 302 normally holds the pawl 301 in the position shown, with a clearance between the pawl and the ear 398 on the arm 399 of the feeling finger frame.

After the impression has been made, the universal cam plate 395 is slid to the left, as viewed in Figs. 25, 26 and 28, to engage the cam 401 with the roller 397 and raise the slide 389. As the frame 388 is moved upwardly from the position shown in Fig. 28, a plate 404 (Fig. 25) fast on the rear of the frame and lying in the plane of the universal cam plate 395 engages the lower edge of the cam plate to restore the frame 388 to its level or balanced position, thereby restoring the ear 398 to its position in the plane of the pawl 301. The mechanism for actuating the sliding cam plate 395 will now be described.

A pair of cams 410 (Fig. 18) secured to the shaft 296 co-operate with rollers 411 on a pitman 412, pivoted to an arm 413 of a bell crank 414 pivoted on the shaft 323. A link 415 connects an arm 416 of the bell crank 414 to an arm 417 free on a shaft 418 supported in three brackets 419 and 420 (Fig. 19—A) and 421 (Fig. 19—B) secured to the back frame 166. The cams 410 make one complete rotation in a clockwise direction at each operation of the machine, to slide the pitman 412 first to the right and then back to its normal position, as shown in Fig. 18. This sliding of the pitman 412 rocks the bell crank 414 first counter-clockwise and then clockwise to normal to raise and lower the link 415.

A stud 422 (Fig. 19—A) in an arm 423 of a bell crank lever 424 pivoted on a stud 425 supported in the back frame 167 projects through an open slot of an ear 426 on the link 415. A stud 427 in an arm 428 of the bell crank 424 engages a notch in the universal cam plate 395. As the link 315 is raised and lowered by the action of the cams 410 (Fig. 18), it rocks the bell crank 424 (Fig. 19—A) first clockwise and then back to its normal position, to slide the universal cam plate first to the left and then back to the right, as viewed in Fig. 19—A.

The notched rack and rocking double feeler frame arrangement for selecting the hammers which are to be operated, permits of a very great flexibility. By its use, any one column or any group of columns may be selected by any key or any combination of keys. Likewise, movement of the total control lever 40 to any of its several positions may be made to control the selection of a certain column or plurality of columns.

In the present machine it is desired to print certain data on two or more sections of the statement and certain other data on four sections. It is, therefore, necessary that certain keys control the selection of a particular group of columns.

Specifically, the "previous electric" key and the "previous gas" key select the first or date column, the fifth, seventh and the twelfth or meter number column, and causes the hammers therefor to be operated. The "present electric" key and the "present gas" key select the fourth and sixth columns, and the "amount electric" key and the "amount gas" key select the third, ninth, tenth and eleventh columns. Movement of the total control lever to its first position below its adding position, that is, to its "total gas or electric consumed" position, selects the second and eighth columns. Movement of the total control lever to any of its several other positions, that is the second or third position above or below the adding position, selects the eleventh column only.

A detailed description of the action of one of the rocking feeler frames 388 to determine if the particular hammer associated therewith is to be operated, will now be given.

Figure 13:
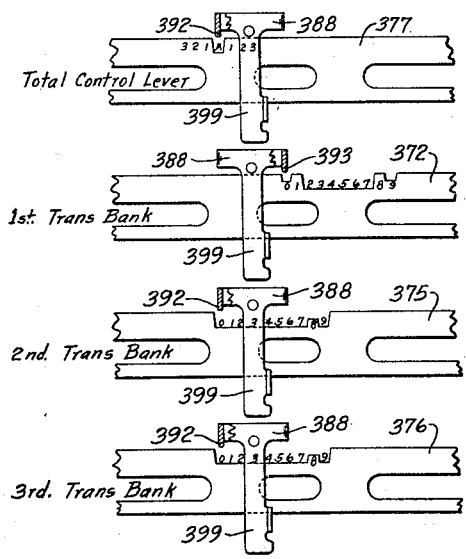
Fig. 13 is a diagrammatic view showing fragments of the upper impression selecting slides, together with one of the rocking feeler finger frames which selects the upper printing hammer for operation.

The frame 388 for the third column from the left is shown diagrammatically in Fig. 13. Feeler fingers 392 are formed on the left hand portion of this frame to co-operate with the selecting slides 377, 375 and 376 (see also Fig. 27) for the total control lever, the second transaction bank, and the third transaction bank, respectively. The single feeler finger 393 (see also Fig. 29) on the right hand portion of the frame 388 for this particular column, co-operates with the selecting slide 372 for the first transaction bank.

Faces of different heights or levels are cut in the upper edge of each of these selecting slides opposite the fingers 392 or 393. These faces form three levels, namely, high, intermediate and low.

After the slides are differentially positioned, as above described, under control of the total control lever, the first, second and third transaction banks, and after the cam plate 395 is moved to the right (Fig. 25), the spring 402 draws the vertical slide 389 and the frame 388 downwardly until the fingers 392 and 393 contact the particular face of the slides previously brought beneath them. As explained above, if the finger 92 on the left side of the frame 388 and the finger 393 on the right side of the frame, both contact high intermediate or low levels, the rocking frame 388 will remain level, as shown in Fig. 26, with the ear 398 preventing movement of the pawl 301 out of the path of the finger 302. If, however, the fingers 392 find a low level, as viewed in Fig. 28, and the fingers 393 find either an intermediate or a high level, the spring 402, as it draws the slide 389 downwardly, will cause the frame 388 to rock out of its perpendicular position to remove the ear 398 from the path of the pawl 301 and thereby permit the spring 400 (Fig. 17), upon operation of the machine, to swing the pawl 301 out of the path of the finger 302 to disable the hammer operating mechanism for this particular column.

An example of the manner in which this particular column is selected when certain of the transaction keys are depressed, and also an example of how the hammer is disabled when certain other transaction keys are depressed, will now be given.

Let it be assumed that it is desired to register and print the amount, in dollars and cents, of the electric bill, as illustrated in Fig. 36. This amount is to be printed in columns 3, 9, 10 and 11 of the statement.

The amount of the bill is set up on the keyboard by depressing the proper amount keys 30 (Fig. 2). The "amount electric" key 37, which is the eighth key from the bottom in the third bank of transaction keys, is depressed, and the machine is then released for operation by depressing the motor release bar 40. The total control lever remains in its "add" position. The slide 377, therefore, remains in the position shown in Fig. 13 throughout the operation. Since no key is depressed in the first or second transaction banks, the differential mechanisms for these banks will be stopped in the zero positions by their respective zero stop pawls and the selecting slides 372 and 375 (Fig. 13) for the first and second transaction banks respectively, will therefore remain in their zero positions. In the third transaction bank, however, the "amount electric" key in the eighth position is depressed so that the differential for this bank will stop under control of this key in the eighth position, thereby adjusting the rack 376 to its eighth position.

The selecting face in the "add" position of the slide 377 (Fig. 13) associated with the total control lever has a low level directly under the feeler finger 392 (Figs. 13 and 27). Slides 372 and 375, adjusted by the first transaction bank and by the second transaction bank, respectively, remain in their zero positions. In the slide 372 for the first transaction bank, an intermediate level is in the zero position directly beneath the finger 393. In the slide 375 for the second transaction bank, a low face or level is in the zero position beneath the finger 392. The eighth position on the rack 376 for the third transaction bank is an intermediate level, and this rack is moved to its eighth position under control of the "amount electric" key 37 (Fig. 2) which positions the intermediate level beneath the finger 392.

When the sliding cam plate 395 is moved to the right, as viewed in Figs. 25 and 26, to remove the cam 401 from beneath the roller 397 for the particular slide 389, and the spring 402 draws the slide 389 downwardly, the fingers 392 and 393 will contact the intermediate levels, so that the slide 389 is held in its level position, as shown in Fig. 26. In this position, as described above, the hammer for this (the third) column will be operated.

Assuming now that the "present electric" key 33, which occupies the ninth position in the second row of transaction keys, is depressed to register the present reading of the electric meter. It is desired to print this data in the fourth and sixth columns only. Therefore, it is necessary to disable the hammers in the remainder of the columns. An explanation will now be given of the disabling of the hammer for column three.

It will be remembered that depression of this key 33 moves the zero stop arm 60 (Fig. 4) in the first bank of transaction keys to its ineffective position. The differential for this bank of keys will, therefore, be stopped in the ninth position, which as above described, sets the slide 372 to the ninth position. Likewise, the differential mechanism associated with the second bank of transaction keys will be stopped under control of the "present electric" key 33 in the ninth position, thereby positioning the slide 375 for this bank to its ninth position. The ninth position of the slide 372 for this particular column (column three) is an intermediate level. On the slide 375 for the second bank of transaction keys, the ninth position has a low level. In this case, the slide 376 for the third transaction bank remains in its zero position, since no key is depressed in that bank. The zero position on this slide for the third column is a low level. There is now a low level on each of the slides 377, 375 and 376, under the fingers 392. However, the slide 372 presents an intermediate level in its ninth position under the finger 393.

Now when the spring 402 moves the slide 389 downwardly, the finger 393 contacts the intermediate level in the ninth position of the rack 372 and as the downward movement of the slide 389 continues, the fingers 392 seek the low levels now thereunder on the slides 377, 375 and 376, thereby rocking the frame 388 to remove the ear 390 on the arm 399 from the path of the pawl 301 so that as the finger 302 is actuated, the spring 400 (Fig. 17) rocks the pawl 301 out of the path of the finger 302, thus crippling the hammer operating mechanism for this particular column, which is the third column from the left, as viewed on the statement illustrated in Fig. 36.

It is to be understood that the structure just described, admits of very great flexibility or variation, and it is not, therefore, desired to limit the invention as to the structure or the particular sysem of notches or levels in the selecting slides illustrated herein.

Zero elimination

After the segmental gears 250 (Fig. 3) associated with the bank of keys in which keys have been depressed, are differentially positioned, the segmental gears 250 to the left of the highest denomination in which a digit is set up, are moved backwardly one step. It should be noted that in these higher order banks the segment gears 250 are still standing at zero, since no keys were depressed in these banks. The space next to "0" on the type wheels are blank, as is usual, therefore nothing is printed from the wheels which are moved backward one step. This mechanism is known in the art as a "zero elimination" mechanism. A description of this mechanism will now be given.

The zero elimination mechanism shown in Figs. 3, 22, 23 and 24, operates to move the segmental gears 250 to the left of the highest denomination in which a digit has been entered one step in a counter-clockwise direction, to move such higher denomination type wheels backward from their zero positions to their blank positions.

Immediately after the segment 138 (Fig. 3) is differentially positioned, the aligner 140 locks it against movement. It is necessary, therefore, to disconnect the link 244 before the segmental gear 250 can be moved backward one step.

The nose of a restoring member 430 (Figs. 3, 22 and 37) free on the shaft 251, normally rests against the link 244 and holds the latter in the position shown in Figs. 3, 22 and 23, so that the stud 243 will draw the link 244 downwardly, rock the segmental gear 250 clockwise and adjust the type wheels according to the key depressed. With the link 244 in this position, that is, with the horizontal section of the notch in the slot 246 embracing the stud 243, the segmental gear 250 cannot be rocked counter-clockwise from its zero position. The end of a rod 432 (see also Figs. 22A, 23 and 24) fast in an arm 433 secured to the shaft 251, projects through a hole in the restoring member 430. The shaft 251 is rocked counter-clockwise and then clockwise to normal at each operation of the machine by mechanism to be described later, whereupon the arm 433, through the rod 432, rocks the restoring member 430 counter-clockwise and withdraws the nose thereof from contact with the link 244. A disabling member 434 (Figs. 23 and 24), one end of which is pivoted to a stud in the rear end of a lever 435 (see also Fig. 22A) pivoted on a stud 436 in the restoring member 430, is then lowered, in a manner later described, and moved to the left, as viewed in Fig. 3, by the arm 433 on shaft 251, to engage a stud 437 (as shown in Fig. 24) in the link 244 and rock said link counter-clockwise about its pivot on the stud 258. This rocking movement of the link 244 removes the horizontal section of the slot 246 from the stud 243, and continued movement of the disabling member 434 to the left, carries the link 244 and the segmental gear 250 with it. The bottom of the slot 246 is now in engagement with the stud 243, as shown in Fig. 24, the segmental gear 250 having been moved one step in a counter-clockwise direction to reversely move the type wheel associated therewith to its blank position.

As the restoring member 430 (Figs. 22 and 22A) moves to the left, urged by the rod 432 in the arm 433, it carries with it the lever 435 pivoted thereto, and consequently the disabling member 434 pivoted on the lever, therewith. A roller 443 on the lever 435 projects through a cam slot 444 in an elimination control plate 445 journaled on the shaft 251. As the member 430 carries the lever 435 with it to the left, the roller 443 engages the active portion of the cam slot 444 and rocks the lever 435 clockwise about its pivot on the stud 436, to lower the rear end of the hooked disabling member 434. As the movement of the member 430 to the left continues, the forward end of the member 434 is raised by stud 436, which is raised by stud 443, on link 435, coacting with cam slot 444 until the bottom of a slot 446 engages the rod 432. The member 434 is now locked in its effective position, and continued movement thereof to the left, engages the hook on the member 434 with the stud 437 in the link 244, and unlocks the link from the stud 243 in the serrated segment 138, and raises said link to the position shown in Fig. 24, which moves the segmental gear 250 one step in the reverse direction, thereby pulling the type wheel to re- move the zero thereon from the printing position and presenting a blank space thereto.

When, near the end of the operation of the machine, the shaft 251 is rocked clockwise, the arm 433 and rod 432 carry the restoring member 430, the lever 435 and hooked crippling member 434 therewith. The link 244 is thereby lowered, and the segmental gear 250 is moved clockwise to restore the type wheel to its zero position. As this occurs, the roller 443 moving in the cam slot 444 rocks the lever 435 counter-clockwise to raise the rear end of the hook member 434, thereby disengaging said hook from the stud 437. As the link 244 is lowered, the horizontal portion of the slot 246 therein, comes opposite the stud 243. Near the end of the clockwise movement, the nose of the restoring member 430 contacts the edge of the link 244 and rocks the link clockwise about its pivot on the stud 258 to move the horizontal section of the slot 246 into engagement with the stud 243. The parts just described are now in positions in readiness for a subsequent operation.

The means for rocking the shaft 251 will now be described.

This mechanism is shown in Fig. 37. It will be remembered that the shaft 296 makes one complete rotation in a clockwise direction at each printing operation of the machine. A cam 450 secured to the shaft 296 drives a pitman 451 pivoted to an arm 452 fastened to the shaft 251, to rock the arm 452 and shaft 251 first counter-clockwise and then clockwise to normal.

When it is desired to print the zero, the above described mechanism for moving the segmental gear 250 to the left, whereby the type wheel is moved to its blank position, is disabled. This is accomplished by the differential mechanism of the highest denomination, in which a key is depressed.

An arm 453 (Figs. 22, 23 and 24) free on the shaft 139 but secured to one end of a hub 454 which has the aligner segment 138 secured to its opposite end, carries a stud 455 which normally lies in a notch 456 formed in the member 445. Assuming that it is desired to print an amount wherein it is necessary to print the zeros to the right of the highest digital denomination, for instances, $100,000.00. The "1" key in the hundred thousand dollar bank is depressed, and in this case it is not desired to eliminate the zeros in the units and tens of thousand of dollar banks. As they appear in Fig. 22, the link 132, aligner segment 138, connecting link 244 and segmental gear 250 at the left of the figure, are associated with the hundreds of thousand dollar bank of keys, whereas the group of identical parts appearing at the right hand part of this figure are adjusted by the differential mechanism controlled by the keys in the tens of thousand dollar bank. In Fig. 23, the link 132, segment 138 and the elimination disabling arm 453 associated with the hundreds of thousand dollar bank, appear together with the mechanism for moving the segmental gear 250 for the next lower denomination backward one space, to eliminate the zero on the tens of thousand dollar type wheels.

Upon operation of the machine, the differential mechanism moves the link 132 (Figs. 22 and 23), for the hundred thousand dollar denomination, downwardly to rock the segment 138 and the arm 453 clockwise to the "1" position. The stud 455 on the arm 453, as it moves out of the notch 456 in the zero position, cams the member 445 for the next lower order in a counter-clockwise direction to the position shown in Fig. 23. A tail 457 projecting downwardly from the member 445 co-operates with the stud 455 when said stud is in any of its nine positions, to hold the member 445 in its moved position.

The counter-clockwise movement of the member 445 positions the cam slot 444 to the left, so that when the arm 433 and the member 430 pull the lever 435, which actuates the hooked member 434, toward the left, the roller 443 will not engage the active part of the cam slot until after the hook has passed to the left of the stud 437 in the link 244. Therefore, the horizontal section of the slot 246 in the link 244 remains engaged with the stud 243 in the segment 138, and since this segment is locked against movement by the aligner 140 (Fig. 3), it is obvious that the segmental gear 250 is also locked against movement in its zero position.

The member 445, controlled by the hundred thousand dollar order, directly disables the zero elimination for the ten thousand dollar order. However, it is necessary to cripple the elimination mechanism for the units of thousand dollar type wheels also. To accomplish this, each of the members 445 below the highest denomination in which a key is depressed, is rocked counter-clockwise to delay the effectivity of the cam slot 444. For this purpose a projection on the member 445 carries a stud 458 having its end co-operating with the next lower order flat on the lower side thereof, and co-operating with the next higher order flat on its upper side.

As can be seen by reference to Fig. 22, when the member 445 for any one denomination is rocked counter-clockwise, the flat stud 458 contacts the flat stud 458 of the next lower order to rock the member 445 for such lower order also in a counter-clockwise direction. The stud 458, however, does not affect the member 445 for the next higher order, as on its counter-clockwise movement, said stud moves away from the stud 458 of the next higher order.

If a key is depressed in the highest amount bank in the machine and the stud 455 rocks the member 445 for the next lower order to its ineffective position, the member 445 for this order rocks the member 445 for all the lower orders counter-clockwise by means of the studs 458 in said members.

If at the beginning of the following operation, the aligner segment 138 is returned to its zero position, which brings the stud 455 on the arm 453 opposite the notch 456 in the member 455, a strong spring 459 coiled about the shaft 281, restores the member 455 to its effective position, where it remains until the differential mechanism again moves the stud 455 to any one of its nine positions.

There is no zero elimination mechanism provided for the units of dollars, tens of dollars or the hundreds of dollars type wheels, inasmuch as it is desired to print the zeros in these positions when the machine is operated and there are no keys depressed in these banks.

*Paper carriage*

In addition to printing in a plurality of columns on a statement sheet, which columns are selected automatically under control of the transaction keys, the machine is provided with a paper carriage shiftable longitudinally in the machine to move the statement sheet so that other columns thereon may be brought opposite the groups of type wheels to have impressions made therein.

The record material is normally in a raised position where the last impression is visible to the operator. Means is provided to lower the record material to the proper printing position to receive the impression and to again raise it near the end of the operation so that the last impression is visible.

Mechanism is provided to automatically advance the record material at each operation of the machine. This mechanism is controlled to advance the record material either one or a plurality of spaces at each operation of the machine. The paper feeding mechanism may be crippled so that the record sheet will not be advanced, in which case the impressions of the various operations required to complete an entry, will be made on the same line. This condition is illustrated by the statement shown in Fig. 36.

The paper carriage includes generally a channeled slide 460 (Figs. 35 and 39) to each end of which is secured a bracket 461 supporting a paper feeding and shifting roll 462. The slide 460 is mounted in a runway or bracket 463 secured to the back frame 167 and is shiftable longitudinally in the runway on anti-friction rollers 464. An angular retaining bar 465 secured to the runway 463 takes the forward thrust of the carriage. A plurality of anti-friction rollers 466 interposed between the downwardly extending angle of the bar 465 and the slide 460, reduces the friction between said bar and slide when the carriage is shifted. The paper shifting and feeding roll includes a plurality of rollers, only two of which are illustrated herein at 462 and 467 (Fig. 34). Each of the rollers 462 and 467, and those not shown, are made from any semi-resilient material formed on a tube 469 rotatively mounted on a tube 468. To support the paper feed roller, a disk 475 secured to the end of the tube 468 is also secured to the end of a trunnion 476, supported in the bracket 461. Both ends of the tube 468 are supported in this manner.

Fig. 34 illustrates how the platen may be divided into a plurality of sections, which sections can be rotated independently of each other. As above stated, the roller 462 is formed on a tube 469 and the roller 467 is formed on a separate tube 469. The roller 467 is driven from the roller 462 by a collar 470 slipped over the tube 469. This collar 470 has a tenon 471 which is entered in a groove 472 at the ends of the tubes 469, therefore, when the roller 462 and its tube 469 are turned, the tenon 471 turns the adjacent tube 469 and its roller 467.

When it is desirable to prevent rotation of the roller 467, the operator slides the collar 470 either to one side or the other, so that it does not engage both tubes 469.

*Paper feed—manual*

To feed the paper manually, a knurled knob 477 (Figs. 1, 34 and 43) rotatably mounted on the trunnion 476, when operated manually, rotates a gear 478 secured to its inner end. This gear rotates a gear 479 mounted by means of its hub 480 in a bearing 481 fast in the bracket 461. The hub 480 for the gear 479 is clutched to a hub 482 on a gear 483 which meshes with and rotates the gear 484, rotatably mounted on the trunnion 476. The tube 468, upon which the roller 462 is formed, is fast on a disk 485 secured to the side of the gear 484 and is rotated thereby when the knob 477 is turned.

Paper feed—automatic

The paper is automatically shifted to the printing position and back to its visible position by segmental gears 486 (Fig. 39), one being fast on each end of a shaft 487 supported in the brackets 461. Since the mechanisms actuated by the segmental gears 486 are identical at both ends of the carriage, only one of them will be described. The segmental gear 486 meshes with a segmental gear 488 free on the trunnion 476. Mechanism hereinafter to be described rocks the segmental gear 486 first clockwise and then back to normal, at each operation of the machine. The gear 486 rocks the segmental gear 488 first counter-clockwise and then back to normal position. The segmental gear 488 (Figs. 4, 39 and 40) carries an upwardly extending arm 489 in which is mounted a short shaft 490. A stud 491 in a spring-pulled arm 492 (Fig. 40), free on the short shaft 490, engages an aligning ratchet 493 rotatably mounted on the trunnion 476. A gear 494 (Figs. 34 and 40) secured to the aligner ratchet 493 meshes with a gear 495 rotatably mounted on the hub 482 of the gear 483. A spring friction washer 496 rotated with the gear 483 by means of pins 497 in the gear projecting through openings not shown in the washer, is adapted to be compressed between the gears 483 and 495, so that these gears rotate in unison to rotate the gear 484 and consequently the feed roller 462.

The aligner ratchet 493 co-acting with the spring-pulled stud 491 (Figs. 40 and 43) forms a convenient means for determining the space between printing lines when the record material is fed manually.

When the segmental gear 486 (Fig. 39) rocks the segmental gear 488 counter-clockwise, carrying the arm 489 and the arm 492 therewith, the tension of the stud 491 on the serrated periphery of the ratchet 493 is sufficient to rock said ratchet and the gear 494 secured thereto, in a clockwise direction. The gear 494 rocks the gear 495 in a counter-clockwise direction, which frictionally drives the gear 483 also in a counter-clockwise direction, to drive the gear 484 and thereby the roller 462, in a counter-clockwise direction to lower the record material to the proper printing position.

To control the advancement of the record material, it is only necessary to stop the roller 462 and the record material with the last impression, either one or two spaces above the printing position. For this purpose, a dog 500 (Figs. 38 and 40), pivoted on a stud 501 in the bracket 461, rigidly connected to a lever 502 also pivoted on the stud 501, lies in the plane of and co-operates with the ratchet 493. The upper end of the lever 502 normally rides on the periphery of the paper feed control plate 503, being spring-pressed thereagainst and thereby holds the nose of the dog 500 just clear of the serrated periphery of the ratchet 493.

A stud 504 (Fig. 40) in an arm 505 pivoted on the short shaft 490, is spring-pressed into engagement with one of three notches formed in the periphery of the control plate 503 to hold said plate in the position to which it is manually adjusted by means of a forwardly extending handle 506 thereon. The stud 504 on the arm 505 also serves to rock the control plate 503 with the arm 489 and the segment gear 488, and also with the ratchet 493.

A recess 507 formed in the periphery of the plate 503 just below the adjusting handle 506 (Fig. 40), is rocked downwardly at each operation of the machine. If the plate 503 remains in adjustment in the position shown in Fig. 40, the recess 507, on its downward movement, will not be brought opposite the lever 502, and therefore, the dog 500 will be held clear of the ratchet 493 and the paper will not be advanced. If, however, the control plate is moved counter-clockwise to its second or middle position, the recess 507 will be moved underneath the lever 502 one step before completion of the clockwise movement of the ratchet 493. The lever 502, spring-urged in a counter-clockwise direction, now moves into the recess 507, carrying the nose of the dog 500 into engagement with one of the serrations in the periphery of the aligner ratchet 493, thereby arresting this ratchet and with it the gears 494, 495, 483 and 484, together with the paper roller 462, one space advanced from the printing position. Likewise, if the control plate 503 is moved counter-clockwise to its second position, the recess 507 arrives opposite the lever 502 two steps before completion of the counter-clockwise movement, which permits the spring-urged lever 502 to engage the dog 500 with the aligner ratchet 493 two spaces earlier, thereby arresting the paper roller and the record material with the last impression thereon, two spaces above the printing position.

A lever 508 (Figs. 1, 34 and 43) having an eccentric cam 509 formed thereon, is provided for the purpose of manually tensioning the spring washer 496 to cause the gears 483 and 495 to rotate in unison. The cam 509 is pivoted on a tongue 510 projecting from the head 511 of a screw 512 in the hub 482 of the gear 483. The flattened end 513 of the screw 512 projects through a slot in a disk 514 which is fastened to the gear 483 by a screw 515. The disk 514 thereby prevents the screw 512 from turning relative to the hub 482 until the screw 515 is removed for the purpose of adjusting the screw 512.

As the lever 508 is moved to the position shown in Fig. 34, the cam 509 bearing on the face of the gear 478, draws the gear 483 toward the gear 495 which compresses the spring washer 496, thereby causing sufficient friction between said gears 483 and 495 to rotate them in unison.

The record material is inserted in the carriage over a curved guide plate 516 (Fig. 39) supported by a plurality of legs 517 secured to lugs 518 integral with the channelled slide 460. The record material passes between the roller 462 and a plurality of small spring-pressed tension rollers 519 (Fig. 42), and passes in close proximity to the rear of the printing wheels into a chute 525 supported by the cross frame 47 and the printer frame 166.

Each of the tension rollers 519 is supported in a frame 526 consisting of two arms joined by a yoke and pivoted on a lug 527 projecting downwardly from a supporting bar 528 fast on the short shaft 490. A spring compressed between the yoke on the frame 526 and the bar 528 tensions the roller 519 against the record material or against the roller 462. The clockwise movement of the frame 526 is limited by extension on the arms of the frame 526 contacting the under side of the bar 528.

To release the tension of the roller 519 for the purpose of inserting a new sheet of record material or adjusting the sheet already in the carriage, there are provided two eccentric cams 529 (Fig. 41), one secured to a rod 530 near each end thereof. This rod 530 extends the entire length of the carriage within U-shaped slots in arms 531 secured to the short shafts 490. Counter-clockwise movement of two arms 532 secured to the rod 530 near each end thereof, through the cams 529, rocks the arms 531 and the short shafts or trunnions 490 also counter-clockwise (as viewed in Fig. 41), thereby rocking the bar 528 counter-clockwise and releasing the tension of the rollers 519. The tension rollers 519 are again brought into contact with the roller 462 or the record material, by moving the arms 532 clockwise to the position shown in Fig. 41.

The segmental gears 486 on the shaft 487, which drive the segmental gears 488 and arms 489, are given a rocking movement first clockwise and then counter-clockwise to normal, at each operation of the machine, by a cam 533 (Fig. 39) secured to the shaft 296, and springs 557 (only one being shown). The cam 533 co-operates with a roller 534 on a pitman 535 pivoted to a downwardly extending arm 536 of the bell crank 537 pivoted on the shaft 323. A link 538 connects the rearwardly extending arm 539 of the bell crank 537 to an arm 540 secured on the shaft 418. Links 541 (Figs 19—A, 19—B and 39) connect two arms 542, one secured to each end of the shaft 418, with a rod 543 extending between the segmental gear 486.

Each of the links 541 is provided with a guide, to prevent sidewise movement of said link, when the carriage, including the segmental gears 486, shaft 487 and the rod 543, is shifted longitudinally in the machine. This guide consists of a bracket 544 (Fig. 39) having two sets of upwardly extending prongs, one set disposed on each side of the link 541, in which is formed a curved slot to accommodate the movement of the rod 543.

The cam 533 makes one complete rotation in a clockwise direction to slide the pitman 535 to the right. The pitman rocks the bell crank lever 537 counter-clockwise to raise the link 538 and rock the shaft 418 counter-clockwise. After the roller 534 passes the high part of the cam 533, the springs 557 restore the links 541 to normal positions to rock the segmental gears 486 counter-clockwise to normal to actuate the paper feeding and shifting mechanism, as described above. The clockwise rocking of the shaft 418 restores the link 538, bell crank 539 and pitman 535 to normal positions. There is a knob 477 and platen roller feeding mechanism at each end of the platen, whereby the different sections of the platen may be fed different distances and independently of each other.

*Ink ribbon*

An ink ribbon 544 (Figs. 44 and 45) forms a conventional means for making the impression from the type wheels onto the record material a legible one.

The ribbon 544 is made in two fields, the lower field being red and the upper field black, or any other suitable colors. The upper field is utilized on adding or data printing operations, and the lower or red field is shifted by mechanism to be described later, so that totals and sub-totals are printed in red.

The ribbon is wound on spools 545 and 546 (Figs. 44 and 45) supported on studs 547 and 548 respectively, in a cross frame 549 extending between the brackets 239 and 240. After leaving the spools 545 and 546, the ribbon passes over guide rollers 550 and 551. It then passes through slots cut in ears 555 and 556, formed on a slide 552, which controls a conventional reversing mechanism for the ribbon feed.

This ribbon reversing mechanism is of a type old and well known in the art, and closely approximates the reversing mechanism illustrated in Fig. 20 of application for Letters Patent of the United States, Serial No. 92,771, filed March 6, 1926 by Charles H. Arnold (now Patent 1,840,555, granted January 12, 1932). It is not thought necessary, therefore, to include a detailed description of the ribbon feeding and reversing mechanism in this application.

The feeding mechanism for the ribbon is operated by an arm 553 pivoted on the stud 547, which supports the spool 545. To rock the arm 553, a horizontal slot 554 (Fig. 8) in the lower end of a slide 560 guided by screw studs 561, surrounds the stud 95 in the arm 85, previously described. It will be remembered that the cam groove 87 in the gear 88 first lowers and then raises the arm 85 at each operation of the machine. This vertical reciprocating movement of the arm 85 first lowers and then raises the slide 560. A slot formed in an ear 562 (Fig. 44) on the upper end of the slide 560, surrounds a stud 563 in one arm 564 of a bell crank 565 pivoted on a stud 566 in the cross frame 549. A link 567 connects one arm 568 of the bell crank 565 to the ribbon feed arm 553.

The vertical reciprocating movement of the slide 560 rocks the bell crank 565 first clockwise and then counter-clockwise to normal, which by means of the link 567, swings the ribbon feed arm 553 first to the right and then back to the position shown in Fig. 44, to operate the ribbon feeding mechanism.

Figure 12:
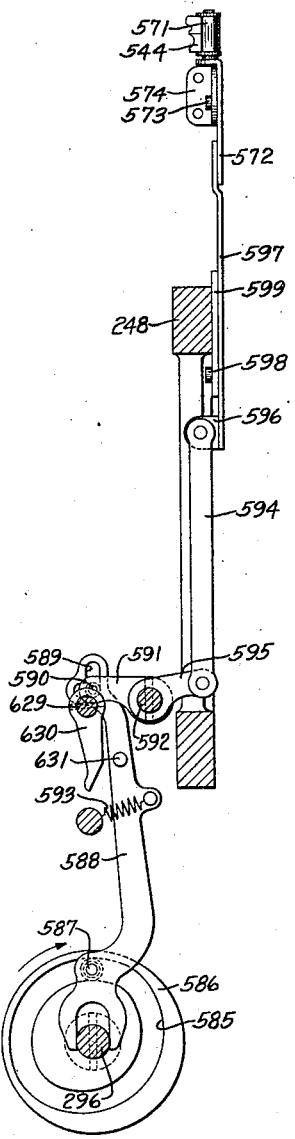
Fig. 12 is a detail side view of the ribbon shift mechanism.

After the ribbon passes the ears 555 and 556 on the slide 552, it twists from the horizontal position to a vertical position and passes around guide rollers 569 (Figs. 44 and 45) supported on brackets 570 secured to the cross frame 549. At the rear of the machine, the ribbon is guided by two rollers 571 supported on a vertically movable frame 572 (Figs. 12 and 33). Studs 573 (Figs. 12 and 45) projecting through slots (not shown) in brackets 574 secured to the brackets 239 and 240, guide the frame 572 in its vertical movement.

As the end of the ribbon, when fed in either direction, approaches the ear on the slide 552, a button 575, one on each end of the ribbon 544, contacts with a particular one of ears 555 or 556, depending on the direction of movement of the ribbon, and draws the slide 552 to its alternate position. As viewed in Figs. 44 and 45, the ribbon is being wound on the spool 546 and unwound from the spool 545. The button 575 is, therefore, approaching the ear 555. A stud 576 (Figs. 44 and 45) on an arm 577 of a spring-pulled bell crank lever 578 pivoted on a stud 579, engages one of a pair of notches formed in the upper edge of the slide 552 to align said slide in the particular positions into which it is moved.

*Ink ribbon shifting mechanism*

Mechanism will now be described for raising the ink ribbon to present the red field to the printing position on total and sub-total taking operations.

A cam groove 585 (Fig. 12), cut in the face of the cam 586, fast on the shaft 296 co-operates with a roller 587 on a pitman 588, to first lower and then raise said pitman at each operation of the machine. The pitman 588 is guided by the shaft 296 at its lower end, and by a slot 589 at its upper end, surrounding a stud 590 on an arm 591 fast on a shaft 592 supported by the side frames 45 and 46. A spring 593 (Fig. 12) normally holds the pitman 598 in the position shown in this figure, in which position said pitman is ineffective to rock the arm 591 and shaft 592, when lowered by the cam 586.

When the total control lever 40 (Fig. 11) is moved clockwise or counter-clockwise to one of its total or sub-total taking positions, mechanism is adjusted thereby, which upon subsequent operation of the machine, rocks the pitman 588 to the right to engage a notch of the slot 589 with the stud 590 in the arm 591, so that when the pitman 588 is lowered and raised by the cam 586, the arm 591 and shaft 592 are rocked first counter-clockwise and then clockwise to normal position. Links 594 (Figs. 12 and 33) connect arms 595 fast on the shaft 592 to lugs 596 on the lower end of vertical slides 597 which at their upper ends are secured to the frame 572. The slides 597 are guided by studs 598 therein projecting through slots in brackets 599 secured to the cross frame 47 (see Fig. 12).

The rocking movement given the shaft 592 by the cam 586 first raises and then lowers the links 594, slides 597 and frame 572 to raise and lower the ink ribbon 544. The ribbon is raised just before the impression blow of the printing hammer on total or sub-total taking operations, and it is lowered shortly after the impression has been made.

Mechanism whereby movement of the total control lever 40 (Fig. 12) renders the pitman 588 effective on total and subtotal taking operations to shift the ink ribbon, will now be set forth.

When the total control lever 40 (Fig. 11) is moved in either direction from its "add" position, a slot 600 therein, surrounding a stud 601 on an arm 602 of a bell crank lever 603, rocks said bell crank lever in a counter-clockwise direction. A stiff spring 605, compressed between a guide projection on an arm 606 of the bell crank lever 603 and a similar guide projection on an arm 607, also pivoted on the stud 604, upon movement of the total lever 40 to any of its total or sub-total taking positions, rocks the arm 607 counter-clockwise. The counter-clockwise movement of the arm 607 by means of a cam slot 608 therein surrounding a stud 609 on an arm 610 secured to a shaft 611, rocks said arm 610 and the shaft 611 slightly clockwise. The counter-clockwise movement of the arm 607 relative to the bell crank lever 603 is limited by a stud in the arm 607 projecting through a slot in the bell crank 603. This slot permits clockwise movement of the arm 607 relative to the bell crank 603.

A link 612 (Fig. 8) connects an arm 613 fast on the shaft 611 with a lever 614 pivoted on the stud 86 in the frame 46. The opposite end of the lever 614 is pivoted to the pitman 100 previously described. A stud 620 on the pitman 100 projects into a notch formed in a cam groove 621 cut in the face of a normally inactive cam 622 pivoted on the screw stud 89. When the shaft 611 is rocked clockwise by movement of the total lever, the pitman 100 is slid to the left, as viewed in Fig. 8, which removes the stud 620 from the notch in which it normally rests, into effective relation with the cam slot 621. At the same time, two pins 623 in the pitman 100 straddling an ear 624 on a slide 625, move the slide to the left to engage the end thereof with a recess 626 in the gear 88 whereby the gear 88 and cam 622 will be rotated in unison upon operation of the machine.

For reasons which it is not thought necessary to set forth herein, but which are fully disclosed in the patent to Fuller, No. 1,242,170, and in the patent to Shipley, No. 1,619,796, it is necessary that the drive shaft 122 make two complete rotations in a clockwise direction on total and sub-total taking operations, instead of but one complete clockwise rotation as on adding operations. Since the gear 88 makes one-half of one rotation in a counter-clockwise direction on adding operations when the drive shaft 122 receives one clockwise rotation, the gear 88 and the cam 622 now connected thereto, will on total taking operations, make one complete counter-clockwise rotation.

The configuration of the cam groove 621 is such that on total and sub-total taking operations, the pitman 100 is moved an additional distance first to the left and then back to the position to which it was moved when the total control lever 40 was adjusted from its "add" position to one of its total or sub-total taking positions.

A stud 627 in the extreme right hand end of the pitman 100 passes through a slot in the end of an arm 628 fast on a shaft 629 supported in the frames 46, 66 and 67. The initial movement of the pitman 100 (Fig. 8) to the left, imparted thereto by movement of the total control lever 40 from its "add" position to any one of its total or sub-total taking positions, rocks the arm 628 and shaft 629 counter-clockwise. This movement, however, is not sufficient to bring a downwardly extending finger 630 (Fig. 12), secured to the shaft 629, into contact with a stud 631 on the pitman 588. When, however, during a total taking operation the cam 622 moves the pitman 100 an additional distance to the left and rocks the arm 628 and shaft 629 further counter-clockwise, the finger 630 (Fig. 12) contacts the stud 631 and moves the pitman 588 to the right to engage the notch in the lower part of the slot 589 therein with the stud 590 on the arm 591, thereby rendering the pitman 588 effective to raise the ink ribbon 544 to present the lower field thereof to the type line, so that when the total is printed, the impression wil be made therethrough.

After the cam 586 (Fig. 12) has raised the pitman 588 to lower the ink ribbon, the cam 622 (Fig. 8) moves the pitman 100 to the right to the position to which it was moved when the total control lever 40 was moved from its "add" position. This movement partially restores the shaft 629 and the finger 630 (Fig. 12) and permits the spring 593 to restore the pitman 588 to its ineffective position.

After the machine is brought to rest at the end of a total taking operation, the total control lever 40 is manually restored to its "add" position. This movement of the total control lever restores the parts first described, including the shaft 611, pitman 100, shaft 629 and the finger 630, to their respective normal positions.

Operating mechanism

The machine in which the present invention is embodied is adapted to be driven by an electric motor of any suitable design, such for instance, as the one disclosed in the patent, No. 1,144,418, issued to C. F. Kettering and W. A. Chryst on June 29, 1915.

A crank 632 (Figs. 1 and 33) is provided with which to operate the machine manually in case of failure of the electric current supply. This crank 632 is detachably mounted on a shaft 633 supported in the frames 66 and 67 (Figs. 33). A gear 634 fast on the shaft 633 (Fig. 8) meshes with the large gear 88. The gear 88 meshes with a gear 635 secured to the main drive shaft 122. A gear 636 is also secured to the drive shaft 122 near the righthand end of the machine, as viewed in Fig. 33. This gear meshes with an intermediate pinion 637 pivoted on a stud 638 supported in the side frame 67 of the machine. This pinion 637 in turn meshes with a gear 639 free on the shaft 296. It is the shaft 296 which operates the upper or column printer. Means hereinafter to be described, are provided whereby the shaft 296 may be disabled. The ratio of the train of gears just described is such that it requires two complete rotations in a clockwise direction of the crank 632 to impart one-half of one rotation in a counter-clockwise direction to the gear 88, which in turn imparts one complete clockwise rotation to the gear 635 and the main drive shaft 122 at each operation of the machine. The gear 636 (Figs. 8 and 33) meshing with the idler gear 637 imparts one complete rotation in a clockwise direction to the gear 639. On total and sub-total taking operations, four rotations of the handle 632 are required, which imparts one complete counter-clockwise rotation to the gear 88, which in turn imparts two complete clockwise rotations to the gears 635, 636 and 639, which drives the shaft 122 and shaft 296.

*Printer disabling mechanism*

The present machine may be used for listing or as an ordinary adding machine. During such operations, it is not desired to use the upper or column printer. Also on total and sub-total taking operations, when the drive shaft 122 makes two rotations, as is well known in machines of the type disclosed herein the upper printer operates on the second rotation only for the same reasons that the lower printer operates only on the second rotation in the patents above mentioned. Therefore, manually operated means is provided to control the printing mechanism.

This controlling mechanism is best shown in Fig. 8, where it appears as with the frames 66 and 67 (Fig. 33) removed. The printer controlling mechanism appears in this figure superimposed on the sectional view taken to the left of the frame 66 (Fig. 33). In reality the controlling mechanism is located just inside the extreme righthand side frame 67 of the machine, as is clearly shown in Fig. 33.

The controlling mechanism includes a manually operable lever 640 (Fig. 8) fast on the outer end of the shaft 641 journaled in the frame 67. The lever 640 carries a handle 642 which projects through a concentric slot in the cabinet (see also Fig. 1) which encloses the entire machine. A curved plate 643 secured to the lever 640, and which is rocked therewith, forms a convenient closure for the slot through which the handle 632 projects.

A slot 644 in a link 645 depending from an arm 646 fast on the shaft 641 just inside the frame 67 (Fig. 33) surrounds a stud 647 in a cam arm 648 journaled on the previously described shaft 629.

The lever 640 and the arm 646 and link 645 adjusted thereby, have three positions, namely, rear, central and forward, as designated in Fig. 8 by the numerals 1, 2, and 3, respectively. A stud 649 (Fig. 8) on a spring-pulled arm 650 pivoted on a stud 651 in the frame 67, co-operates with three notches in the arm 646 to align this arm, the lever 640 and the link 645 in the positions into which these parts are manually adjusted.

In its first or rear position, the lever 640 controls the printer so that it operates on each operation of the machine, excepting the first half of total and sub-total taking operations, when it is automatically crippled under control of the total control lever 40, as will be described later.

With the lever 640 in its second or middle position, the printer is disabled on all adding or data entering operations, but is automatically rendered effective to print on the second half of total and sub-total taking operations.

When the lever 640 is adjusted to its third or forward position, the printer is disabled on all operations of the machine.

It will be remembered that the gear 639 (Fig. 8) is free on the shaft 296 and receives one complete clockwise rotation at each operation of the machine. A driving pawl 652 pivoted to the gear 639 normally engages a shoulder on a collar 653 fast on the shaft 296 and drives the shaft 296. A pawl 654 also pivoted on the gear 639, engages the opposite side of the shoulder on the collar 653 to stop the shaft 296 at the end of the operation. A spring 655 constantly urges the pawl 652 in a clockwise direction and the pawl 654 in a counter-clockwise direction.

A stud 660 in the end of an arm 661 pivoted on a stud 662 in the frame 67, projects through a cam slot 663 formed in the cam arm 648. A spring 664 tends to normally hold a shoulder 665 on a bell crank 666 pivoted on the stud 662, against a stud 667 on the arm 661. A downwardly projecting disabling arm 668 of the bell crank 666 is adapted to be moved into the path of a tail 669 of the pawl 652 to disable the printer drive, as will be described later.

On adding operations with the lever 640 in the position shown in Fig. 8, the disabling arm 668 remains in the position shown, that is, clear of the tail 669, thereby permitting the gear 639 through the pawl 652 to drive the printer shaft 296. However, when the total control lever 40 is moved from its add position to any of its total or sub-total taking positions, it rocks the shaft 611 (Fig. 8) slightly clockwise to slide the pitman 100 to the left which, through the stud 627, rocks the arm 628 and shaft 629 slightly counter-clockwise. A stud 670 in an arm 671 fast on the shaft 629 adjacent the cam arm 648 projects across the plane of the cam arm.

As the shaft 629 is rocked counter-clockwise by movement of the total control lever, as described above, the stud 670 rocks the arm 648 slightly counter-clockwise to position the high part of the cam 663 therein in engagement with the stud 660, thereby rocking the arm 661 and through the stud 667, the bell crank 666 slightly counter-clockwise to position the end of the disabling arm 668 in the path of the tail 669 of the pawl 652. Now, when the machine is operated and the gear 639 commences its clockwise movement, the tail 669 wipes the end of the disabling arm 668, and thereby rocks the pawl 652 counter-clockwise about its pivot and out of engagement with the shoulder on the collar 653. The gear 639 continues its rotation idly. As soon as the tail 669 of the pawl 652 is clear of the disabling arm 668, the spring 655 moves the pawl into contact with the periphery of the collar 653.

During the first half of the total taking operation, the cam 622 slides the pitman 100 an additional distance to the left to rock the shaft 629 further counter-clockwise, as described above, which, due to the configuration of the cam slot 563 in the arm 648, rocks the arm 661 slightly clockwise. As the arm 661 is thus rocked clockwise, the spring 664 carries the bell crank 666 and the disabling arm 668 therewith to remove the end of the disabling arm from the path of the tail 669 so that as the pawl 652 continues its clockwise rotation, it engages the shoulder on the collar 653 and drives the shaft 296 to one complete rotation on the second half of the total taking operation.

Near the end of a total or sub-total taking operation, the cam 622 slides the pitman 100 toward the right to partially restore the shaft 629 and arm 671. The cam arm 648 follows the arm 671 on its clockwise movement under the influence of a spring 672. The partial clockwise movement of the cam arm 648 rocks the arm 661 slightly counter-clockwise to reposition the disabling arm 668 in the path of the tail 669. After the machine is brought to rest at the end of an operation, the total control lever 40 is restored to its "add" position, which rocks the shaft 611 (Fig. 8) counter-clockwise to slide the pitman 100 to the right to its home position. This additional movement of the pitman 100 to the right restores the shaft 629 and the arm 671, and by means of the spring 672, restores the cam arm 648 to the position shown in Fig. 8, to rock the arm 661 and disabling arm 668 clockwise out of the path of the tail 669 of the pawl 652, in which position the gear 630 will be enabled to drive the printer shaft 296 on the succeeding operation.

On an operation of the machine, previous to which the lever 640 (Fig. 8) has been moved to its middle or second position, the printer drive shaft 296 is disabled if the operation is an adding operation, and if the operation is a total or sub-total taking operation, the printer drive shaft 296 is disabled on the first half of the operation and is automatically rendered effective on the second half of the total or sub-total taking operation.

Movement of the lever 640 to its middle or second position lowers the link 645 (Fig. 8) to the position shown in Fig. 9, thereby rocking the arm 648 counter-clockwise, by means of the stud 647 engaging the slot 644, to the position shown in Fig. 9, in which position the arm 661 is rocked counter-clockwise to position the bell crank lever 666 with the end of the disabling arm 668 in the path of the tail 669 on the pawl 652, which, as above described, upon operation of the machine, disabled the printer driving mechanism.

Now, when the total control lever 40 (Fig. 11) is moved from its "add" position to any particular one of its total or sub-total taking positions, thereby rocking the shaft 629 (Fig. 8) slightly counter-clockwise, the cam arm 648 is not moved as it was with the lever 640 in its first position. In this case the stud 670 is merely moved down to the cam arm 648, but does not impart any movement thereto. When, however, during the first half of the total taking operation, the cam 622 moves the pitman 100 an additional distance to the left, the stud 670 contacts and rocks the cam arm 648 further counter-clockwise to the position shown in Fig. 10, thereby rocking the arm 661, and by means of the spring 664, the disabling arm 668 clockwise, out of the path of the tail 669 of the pawl 652, thereby rendering the printer driving mechanism effective to operate the printer on the second half of the total or sub-total taking operation.

The third condition of the printer controlling mechanism is with the lever 640 in its third or forward position. In this position the link 645 is lowered until the lower end thereof abuts a stud 673 in an arm 674 of the bell crank 666 and rocks this bell crank and its arm 668 counter-clockwise to position the end of the disabling arm 668 in the path of the tail 669 of the pawl 652, thereby positively disabling the printer drive mechanism on all operations of the machine, so long as the lever 640 is in the third or forward position. In this case the mechanism controlled by the total control lever, is ineffective to render the printer drive mechanism effective on the second half of total and sub-total taking operations.

*Front printer controlling mechanism*

To drive the front printer, a spiral gear 675, the hub of which is secured to the main drive shaft 122 (Fig. 46), meshes with a spiral gear 676 secured to the rear end of a sleeve 677 rotatably mounted on a shaft 678 supported in a bracket 679 and in a printer frame (not shown). The bracket 679 is secured to the base (not shown) of the machine. A disk 680 (Figs. 46 and 47) secured to the forward end of the sleeve 676, carries a driving pawl 681 which normally engages a shoulder on a collar 682 on a hub 683 secured to the shaft 678. The gear 676 and the disk 680 (Figs. 46 and 47) make one complete rotation in a counter-clockwise direction at each operation of the machine. The driving pawl 681 rotates with the disk 680, and carries the collar 682 and consequently the shaft 678 therewith, thus imparting one complete rotation in a counter-clockwise direction to the printer drive shaft 678. A pawl 684 also carried by the disk 680, engages a shoulder on the opposite side of the collar 682 for the purpose of stopping the shaft 678 when the machine is brought to rest at the end of an operation. A spring 685 constantly tends to rock the pawls 681 and 684 toward the shaft 678.

Mechanism will now be described, which is provided for the purpose of disabling the drive for the front printer on the first half of total and sub-total taking operations under control of the total control lever 40 (Fig. 12).

This mechanism includes a stud 690 (Fig. 46) on an arm 691 pivoted on a shaft 692 extending between the frames 45 and 46. The stud 690 projects through an opening 693 in a link 694 pivoted to an arm 695 secured to the shaft 611. A yoke 696 rigidly connects the arm 691 with a disabling arm 697 normally in the position shown in Fig. 46.

Figure 11:
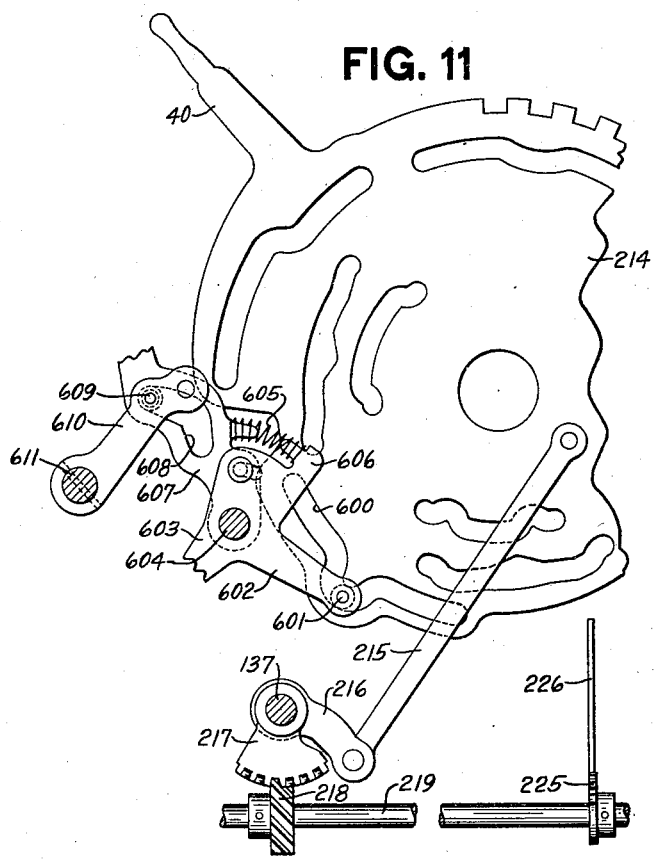
Fig. 11 is a fragmentary side view of the total control lever together with part of the mechanism operated thereby.

When the total control lever 40 is moved in either direction from its "add" position, it rocks the shaft 611 by means of the mechanism illustrated in Fig. 11, in a clockwise direction, as explained above. This movement of the shaft 611, as viewed in Fig. 46, is counter-clockwise, and by means of the arm 695 moves the link 694 downwardly in the direction of its length. Due to the engagement of a shoulder 698 formed in the opening 693 with the stud 690, the link 694 on its downward movement rocks the arm 691, yoke 696 and the disabling arm 697 clockwise about the shaft 692 to position the disabling arm 697 in the path of a tail 699 (Fig. 47) of the driving pawl 681. At the beginning of the operation of the machine, when the disk 680 commences its counter-clockwise rotation (Fig. 47), the tail 699 of the pawl 681 wipes by the disabling arm 697 and disengages the pawl 681 from the shoulder on the collar 682. The disk 680 and the driving pawl 681 continue their counter-clockwise rotation, allowing the shaft 678 to remain stationary throughout the first half of the total taking operation.

Near the end of the first half of a total taking operation, it will be remembered, the cam 622 (Fig. 8) moves the pitman 100 further to the left, which through the lever 614, link 612 and arm 613, gives the shaft 611 an additional movement in a clockwise direction, as viewed in Fig. 8. As viewed in Fig. 46, this additional movement of the shaft 611 imparted thereto by the cam 622, is in a counter-clockwise direction and further lowers the link 694 in the direction of its length, thereby rocking the disabling arm 697 clockwise out of the path of the tail 699 of the driving pawl 681. Now, as the disk 680 and the driving pawl 681 approach their home positions, the pawl engages the shoulder of the collar 682, and as the disk 680 continues its movement, carries the collar 683 and the shaft 678 therewith, thus giving said shaft one complete rotation in a counter-clockwise direction on the second half of the total or sub-total taking operation. When near the end of the second half of the total taking operation, the cam 622 partially restores the shaft 611, the disabling arm 697 will, due to a spring 689, follow the link 694 as it is moved upwardly. After the machine is brought to rest at the end of the total taking operation, the movement of the total control lever 40 to its "add" position, restores the shaft 611, the arm 695 and link 694 to the positions shown in Fig. 46. This movement also restores the disabling arm 697 to its normal position.

To manually disable the printer drive shaft 678, a lever 700, similar to the lever 640 (Fig. 8) for manually disabling the shaft 296 for the upper printer, is fast on one end of a sleeve 702 pivoted on a stud 701 supported in the bracket 239. A link 704 connects a segmental arm 703 fast on the opposite end of the sleeve 702 with an arm 705 of a bell crank 706 pivoted on a stud 707 in the frame 45. A link 708, the upper end of which is pivoted to the other arm 709 of the bell crank 706, is guided by a slot 710 in the lower end thereof, surrounding a stud 711 mounted in the frame 45. The lower part of the frame 45 is broken away in Fig. 46 for the sake of clearness.

The lever 700 and the parts actuated thereby, have three positions, namely, rear, middle and forward, as indicated in Fig. 46 by the reference numerals 1, 2 and 3, respectively. A stud 712 in a spring-urged arm 713 pivoted on a stud 714 in the bracket 239, is adapted to engage one of a plurality of notches formed in the periphery of the segmental arm 703 to align the segment, and consequently the lever 700, in the particular position into which it is moved. If the machine is operated with the lever 700 in the position shown in Fig. 46, the printer drive shaft 678 will receive its required rotation, being disabled only on the first cycle of total or sub-total taking operations, as described above.

However, if prior to the operation of the machine, the lever 700 is moved to its second or middle position, the lower end of the link 708 engages the stud 690 and cams the arm 691 and the disabling arm 697 clockwise to position the disabling arm 697 in the path of the tail 699 of the driving pawl, thereby, upon operation of the machine, disabling the printer drive shaft 678. Now, when the arm 695, actuated by the total control lever, lowers the link 694, the shoulder 698 is moved to, but does not move the stud 690. However, when the shaft 611 is given its additional movement under the influence of the cam 622, the shoulder 698 in the link 694 engages the stud 690 and rocks the disabling arm 697 further clockwise to remove it from the path of the tail 699 of the driving pawl 681, so that, on the second half of the total or sub-total taking operation, the disk 680 will drive the shaft 678 through its requisite rotation. With the lever 700 in this position, that is the middle or second position, the printer is disabled on all but the second half of a total taking operation.

Movement of the lever 700 to its forward or third position lowers the link 708 to the position shown in Fig. 49. This movement does not rock the disabling arm 697 further in a clockwise direction, but an upwardly extending projection 715 engages a stud 716 on the link 694, and rocks said link counter-clockwise about its pivot on the arm 695 against the tension of a spring 617, one end of which is attached to a stud in an upwardly extending portion of the link 694. With the link 694 in this position, as shown in Fig. 49, an elongated portion of the opening 693 lies above the stud 690 and, therefore, the link 694 on its additional downward movement, will be ineffective to rock the disabling arm 697 out of the path of the tail 699 of the driving pawl 681, for which reason the printer is positively disabled on both adding and total taking operations.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:—

1. In a machine of the class described, the combination of a plurality of printing units mounted in rocking frames, means for setting amounts on all of said units simultaneously, means for selecting the unit that is to print, means for rocking the selected unit to the printing position, and means for taking an impression therefrom.

2. In a machine of the class described, the combination of a plurality of printing units mounted in rocking frames, means for setting amounts on all of said units simultaneously, means for selecting the unit that is to print, a plurality of manually operable means to control the selecting means, and means for rocking the selected unit to the printing position.

3. In a machine of the class described, the combination of a plurality of separately mounted printing units, means for setting amounts on all of said units simultaneously, means for selecting the unit that is to print, a plurality of manually operable means to jointly control the selecting means, means for moving the selected unit to the printing position, and means for taking the impression from the selected unit.

4. In a machine of the class described, the combination of a printing unit, a frame for said unit, a link for moving the printing unit frame to move the printing unit to its printing position, gears for differentially setting up amounts on the printing unit, an aliner adapted to be moved into engagement with the gears to aline the printing unit in its moved position while an impression is being taken therefrom, and means on the aliner and co-operating with the printing unit frame so that movement of said frame to move the unit to the printing position engages the aliner with the gears and movement of the frame in the opposite direction disengages said aliner from the gears.

5. In a machine of the class described, the combination of a printing unit mounted in a pivoted frame, gears to set up amounts on the unit, means to rock the frame to move the unit to the printing position, and a normally ineffective aliner moved to effective position by the frame when said frame is rocked to move the unit to the printing position to aline said printing unit.

6. In a machine of the class described, the combination of a pivoted frame the movement of which moves a printing unit to the printing position, an impression hammer, a tripping device for said hammer, and a common means for actuating the pivoted frame and for tripping the hammer.

7. In a machine of the class described, the combination of a pivoted type wheel frame, an impression hammer, means for tripping said hammer, common means for rocking the type wheel frame to move the type wheels to the printing position and for enabling the tripping means to release the hammer, means for actuating the tripping means, and a single means for disabling said rocking means and said enabling means.

8. In a machine of the class described, the combination of a plurality of printing units, hammers for taking impressions from the printing units, normally ineffective releasing means for the hammers, means for moving said releasing means into effective position, means for actuating the releasing means to release the impression hammers, and means for determining which of said releasing means are to be moved to effective position.

9. In a machine of the class described, the combination of a pivoted type wheel frame adapted to move the type wheels to printing position, a hammer for taking impressions from the type wheels, a tripping lever for releasing said hammer, a single pivoted lever for rocking the type wheel frame and for operating a means to render said tripping lever effective, a finger for actuating said pivoted lever, a normally effective pawl intermediate said finger and said pivoted lever, and means whereby said pawl is rendered ineffective to actuate the pivoted lever.

10. In a machine of the class described, the combination of a pivoted frame supporting a printing unit, a lever connected to the pivoted frame, a driving pawl pivoted on said lever, a finger secured to a rocking shaft to engage the pawl and thereby rock the lever, and means controlled by manipulative keys whereby the pawl is moved out of co-operative relation with said finger thereby disabling the lever.

11. In a machine of the class described, the combination of manipulative keys, a type wheel frame, an impression hammer, a normally ineffective tripping lever for said hammer, a single operating lever to actuate the type wheel frame and to render the hammer tripping lever effective, means for actuating said operating lever, a driving pawl pivoted on said operating lever intermediate said actuating means and said operating lever, and means under control of the manipulative keys whereby said driving pawl is moved to its ineffective position to disable said operating lever and the type wheel frame and hammer tripping lever.

12. In a machine of the class described, the combination of a plurality of printing units, means for setting up amounts on all of said units simultaneously, impression hammers for the printing units, operating means for said impression hammers, and means for selecting which of said hammers are to operate, said selecting means including a plurality of rocking frames mounted on movable pivots each frame provided with a plurality of feelers co-operating with a plurality of slides.

13. In a machine of the class described, the combination of a plurality of printing units, means for setting amounts on all of said units simultaneously, hammers for taking impressions from said units, operating means for said hammers, a plurality of selecting slides having a plurality of notches and a plurality of feeler frames each provided with a plurality of feelers co-operating with the plurality of notches in the plurality of slides for selecting which of said hammers are to be operated.

14. In a machine of the class described, the combination of a plurality of printing units, movable supports therefor, means for moving said supports to position the printing unit to the printing position, a plurality of selecting slides, and a plurality of pivotally supported feeler frames each provided with a plurality of feelers co-operating with the plurality of slides for determining which of said movable printing units supports are to be actuated.

15. In a machine of the class described, the combination of a plurality of printing units, pivoted supports therefor, means for rocking said supports to position the printing units to the printing position, a plurality of differentially positioned slides, and a plurality of feeler frames supported on movable pivots each of said frames being provided with a plurality of feelers co-operating with the plurality of differentially positioned slides for determining which of said pivoted supports are to be actuated.

16. In a machine of the class described, the combination of a plurality of printing units, pivoted means for carrying said units to printing position, means for actuating said pivoted means, hammers for taking impressions from the units, means for operating said hammers, a plurality of slides, and a plurality of feeler frames each provided with a plurality of feelers co-operating with the plurality of slides for determining which of said printing units are to be moved to printing position and which of said hammers are to be operated.

17. In a machine of the class described, the combination of printing units, pivotally supported frames therefor, a plurality of impression hammers to take impressions from said printing units, normally ineffective tripping means for said hammers, a single means for rendering said tripping means effective and for rocking the printing unit frames, a plurality of slides having a plurality of notches, and a plurality of feeler frames each provided with a plurality of feelers co-operating with the plurality of notches in the plurality of slides for determining which of said printing unit frames are to be rocked and which of said normally ineffective tripping means are to be rendered effective.

18. In a machine of the class described, the combination with a plurality of normally ineffective groups of printing elements and corresponding impression means to co-operate therewith; of means to select groups of printing elements and their corresponding impression means for operation, including a frame for each group of printing elements and its impression means; manipulative devices; slides differentially positioned under control of the manipulative devices and adapted to control the frames; and means controlled by the frames to shift the groups of printing elements to their printing positions and to render effective the means for tripping the impression means.

19. In a machine of the class described, the combination of a plurality of printing units, a plurality of impression hammers therefor, normally ineffective tripping means for said hammers, a plurality of levers for rocking the printing units to the printing position and for rendering the hammer tripping means effective, operating means for said levers, hooked pawls pivoted on the levers said pawls being normally effective to operate said levers, a plurality of manipulative keys, a plurality of slides differentially set under control of the manipulative keys, said slides having a plurality of faces formed in a plurality of parallel planes and a plurality of rocking frames each frame being provided with a plurality of feelers co-operating with the plurality of faces for determining which of the levers are to be operated to position the printing units and for rendering the hammer tripping means effective.

20. In a selecting means the combination with a plurality of operating elements, of manipulative keys, selecting slides differentially positioned under control of the manipulative keys, a vertical slide for each operating element, a selecting frame pivotally supported on each vertical slide, each frame being provided with a plurality of feelers adapted to co-operate with the selecting slides, a cam plate provided with a cam for each of the vertical slides and normally holding said vertical slides with the selecting frames clear of the selecting slides, means for operating the cam plate after the selecting slides have been differentially positioned to cause the feelers to be moved into contact with the selecting slides, and high and low portions on the selecting slides in a plurality of parallel planes to control the positions of the selecting frames thereby controlling the effectivity of the several operating elements.

21. In a machine of the class described, the combination with a main operating mechanism, and adjustable means to control said operating mechanism to make one and two cycle operations, of a printer drive shaft, means for operating the printer drive shaft from the main operating mechanism, means under the control of said adjustable means to disable the printer drive shaft on the first cycle of a two cycle operation, and a second adjustable means for disabling the printer drive shaft on all operations of the main operating mechanism.

22. In a machine of the class described, the combination with a main operating mechanism, a device for controlling the main operating means to make one and two cycle operations, a printer drive shaft, and means for operating the printer drive shaft from the main operating mechanism, of means under control of said device to disable the printer drive shaft on the first cycle of a two cycle operation, and means for disabling the printer drive shaft on all single cycle operations of the main operating mechanism.

23. In a machine of the class described, the combination with a main operating mechanism, settable means to control the machine to make one and two cycle operations, a printer drive shaft, and means for rotating the printer drive shaft from the main operating mechanism, of automatic means operable when the main operating mechanism makes two cycle operations to render the printer drive shaft operable on only one cycle of such operations, and means for disabling the printer drive shaft on both cycles of a two cycle operation.

24. In a machine of the class described, the combination with a main operating mechanism; adjustable means to control the main operating mechanism to make one and two cycle operations; and a printer drive shaft rotated by the main operating mechanism; of a manually adjustable disabling device settable to a plurality of positions, said device when adjusted to a certain position disabling the printer drive shaft upon operation of the main operating mechanism.

25. In a machine of the class described, the combination of type wheels each having a blank portion; manipulative means; differential means under the control of the manipulative means for controlling the setting of amounts on the type wheels; means for transmitting the differential movement to the type wheels; and means intermediate the differential means and the type wheels for moving the type wheels of higher order than highest upon which a number is set back one step beyond their zero positions to present the blank portion of the wheels in printing position.

26. In a machine of the class described, the combination of type wheels each having a blank space; manipulative means, differential means under the control of the manipulative means for controlling the setting of amounts on the type wheels; means for transmitting the differential movement to the type wheels; segmental gears forming a part of the transmitting means; means for disconnecting the segmental gears from the differential means; and means for moving the segmental gears corresponding to the orders higher than highest upon which a number is set back one step beyond their zero positions thereby moving the zeros on these type wheels back from the printing line and presenting the blank spaces to said printing line.

27. In a machine of the class described, the combination of type wheels each having a blank space one step back of zero position; differential mechanism for controlling the setting up of amounts on the type wheels; means for transmitting the travel of each differential to a particular type wheel, said means including a segmental gear connected to a serrated segment; a member adapted to co-operate with the transmitting means; means for actuating the member; and means for causing the member to disconnect the segmental gear from the serrated segment and to move said gear back one step from its zero position.

28. In a machine of the class described; the combination with printing wheels each having a blank space one step back of zero position and differential means for controlling the setting of amounts on the printing wheels; of means for transmitting the travel of the differential to the printing wheels, said means including a differentially adjustable segment, a segmental member and a link connecting said member and said segment; a rocking member; means for rocking said rocking member; a lever pivotally supported on the rocking member; a normally ineffective floating hooked member an end of which is pivoted to one end of said lever; and a cam member co-operating with the lever to lower the hooked member to its effective position upon movement of the rocking member, the continued movement of which disconnects the link from the adjustable segment and moves the oscillating member back one step to remove the zero on the printing wheels from the printing line.

29. In a machine of the class described, the combination of wheels; differential mechanism for controlling the setting of amounts on said wheels; means including an adjustable member for transmitting the travel of the differential mechanisms to the printing wheels; a differentially positioned segment adapted to be held in its adjusted position; a link connecting the adjustable member and the segment; a rocking member; actuating means therefor; a lever pivotally supported on the rocking member; a normally ineffective hooked member pivoted to said lever; a device for rendering the hooked member effective to disconnect the link from the segment; and means under control of the segment to shift said device to prevent the disconnection of the link from the segment.

30. In a machine of the class described, the combination of printing wheels; differential mechanism for controlling the setting of amounts on the wheels; means for transmitting the differential movement to the printing wheels; a zero elimination mechanism including adjustable members connected by a link; means for shifting the link to disconnect the adjustable members; and means under control of one of said members for preventing the disconnection when said one member has been adjusted out of normal position.

31. In a machine of the class described, the combination of type wheels; differential mechanism for controlling the setting up of amounts on the type wheels; means for transmitting the travel of each differential to a particular type wheel, said means including a plurality of adjustable members and a connection therebetween; a member adapted to co-operate with said connection; and means for shifting said member to operate said connection to disconnect said adjustable members and to shift one of said members backwardly one step.

32. In a machine of the class described, the combination of type wheels; differential mechanism for controlling the setting up of amounts on the type wheels; means for transmitting the travel of each differential to a particular type wheel, said means including a plurality of adjustable members and a connection therebetween; a member adapted to co-operate with said connection; means for shifting said member to operate said connection to disconnect said adjustable members and to shift one of said members backwardly one step; and a device controlled by another of said adjustable members for rendering the last mentioned means ineffective thus preventing backward movement of the first mentioned adjustable member.

33. In a machine of the class described, the combination of type wheels each having a blank space; differential mechanism for controlling the setting of amounts on the type wheels; means for transmitting the travel of each differential to its particular type wheel, said transmitting means including a plurality of adjustable members and a connection therebetween; a member adapted to co-operate with said connection; means for shifting the member in one direction into a position to co-operate with said connection; and means for shifting said member in another direction to render the connection between the adjustable members in effective and simultaneously shift one of said adjustable members backwardly from its zero position to its blank space position.

34. In a machine of the class described, the combination of type carriers each having a blank portion; differential mechanism for controlling the setting of amounts on the type carriers; means for transmitting the travel of each differential to a particular type carrier, said transmitting means including a plurality of adjustable members and a connection therebetween; a device adapted to co-operate with said connection but normally disconnected therefrom; means for rocking said device to move the same into cooperative relation with said connection; means for shifting said device to operate said connection to disconnect the adjustable members and simultaneously move one of said adjustable members out of its zero position and into its blank position; and means controlled by another of said adjustable members for rendering the means which rocks said device ineffective to prevent said device from operating the connection to disconnect the adjustable members when said device is operated by its shifting means.

35. In a machine of the class described, the combination of printing wheels each having a blank space; differential mechanism for controlling the setting of amounts on the wheels simultaneously; means for transmitting the differential movement to all of said printing wheels; a zero elimination mechanism including a plurality of adjustable members and a normally effective connection therebetween; and means for rendering the connection ineffective and simultaneously moving one of the adjustable members backwardly one step from a zero position into a blank position.

36. In a machine of the class described, the combination of printing wheels each having a blank portion; differential mechanism for controlling the setting of amounts on said wheels; means for transmitting the differential movement to all of said printing wheels; a zero elimination mechanism including a plurality of adjustable members and a normally effective connection therebetween; means for rendering the connection ineffective and simultaneously moving one of the adjustable members backwardly one step from a zero position into a blank position; and means under control of another of said adjustable members for maintaining the connection effective when the last mentioned adjustable member has been adjusted out of normal position.

37. In a machine of the class described, the combination of a plurality of groups of type carriers, a printing hammer for each group of type carriers, and means, including notched members, to select a hammer for printing.

38. In a machine of the class described, the combination of a plurality of groups of type carriers, a printing means for each group of type carriers, notched members, and means, including floating members, to select a hammer to print.

39. In a machine of the class described, the combination of a plurality of type carriers, printing means for each carrier, differentially settable notched members, feelers coacting with the notched members, and means controlled by the feelers to selectively render a hammer effective to print.

40. In a machine of the class described having a plurality of printing units mounted in rocking frames and means for setting amounts on all of said units simultaneously, the combination of normally ineffective alining means for said printing units, means for selecting the unit that is to print, means for rocking the unit to printing position, and means controlled by the rocking means for rendering only the alining means for the selected printing unit effective.

41. In a machine of the class described, the combination of a plurality of pivoted type wheel frames, means for rocking said frames to move the type to printing position, a plurality of impression hammers, retaining means for said hammers, normally ineffective tripping means for said retaining means, means for conditioning the tripping means for effective operation, means for actuating the tripping means to release the hammers associated with the conditioned tripping means, and means for selecting which of said type wheel frames are to be rocked and which of said tripping means are to be conditioned to release their hammers.

42. In a machine of the class described, the combination of an impression hammer, a retaining pawl for the hammer, a normally ineffective tripping lever mounted on an arm on a rock shaft, mechanism for moving said tripping lever to effective position, means for rocking said shaft to move the effective tripping lever to release the hammer, said mechanism including an actuating lever operatively connected to the tripping lever, a driving pawl pivoted to said actuating lever, a finger on a second rocking shaft, said finger being adapted to engage the driving pawl to operate the actuating lever to render the tripping lever effective, and means controlled by manipulative means whereby the driving pawl is moved out of cooperative relation with the finger to thereby disable the actuating lever.

BERNIS M. SHIPLEY.

CERTIFICATE OF CORRECTION.

Patent No. 2,050,022.

August 4, 1936.

BERNIS M. SHIPLEY.

It is hereby certified that error appears in the printed specification of the above numbered patent requiring correction as follows: Page 11, first column, lines 54 and 57, for the numeral "59" read 359, and second column, line 59, for "368" read 388; page 12, first column, line 17, for "289" read 389, and second column, line 73, for "92" read 392; page 20, first column, line 55, for the word "disabled" read disables; and that the said Letters Patent should be read with these corrections therein that the same may conform to the record of the case in the Patent Office.

Signed and sealed this 13th day of October, A. D. 1936.

(Seal)

Henry Van Arsdale
Acting Commissioner of Patents.